United States Patent
Manohar et al.

(10) Patent No.: US 11,443,631 B2
(45) Date of Patent: Sep. 13, 2022

(54) ENHANCED ONBOARD EQUIPMENT

(71) Applicant: DERQ Inc., Tortola (VG)

(72) Inventors: Nikhil Manohar, Dubai (AE); Amer Abufadel, Dubai (AE); Georges Aoude, Dubai (AE)

(73) Assignee: DERQ Inc., Tortola (VG)

( * ) Notice: Subject to any disclaimer, the term of this patent is extended or adjusted under 35 U.S.C. 154(b) by 0 days.

(21) Appl. No.: 16/993,606

(22) Filed: Aug. 14, 2020

(65) Prior Publication Data
US 2021/0065551 A1 Mar. 4, 2021

Related U.S. Application Data

(60) Provisional application No. 62/893,616, filed on Aug. 29, 2019.

(51) Int. Cl.
*G08G 1/16* (2006.01)

(52) U.S. Cl.
CPC .............. *G08G 1/161* (2013.01); *G08G 1/166* (2013.01); *G08G 1/167* (2013.01)

(58) Field of Classification Search
CPC ........ G01C 21/36; G08G 1/161; G08G 1/166; G08G 1/167; G08G 1/07; G08G 1/0129; G08G 1/163; G08G 1/0133; G08G 1/162; G08G 1/0116; G08G 1/04; G08G 1/005; G08G 1/0112; B60Q 9/008; H04W 4/40; H04W 4/44; H04W 4/46
See application file for complete search history.

(56) References Cited

U.S. PATENT DOCUMENTS

| | | | |
|---|---|---|---|
| 5,890,682 | A | 4/1999 | Welk |
| 6,472,978 | B1 | 10/2002 | Takagi |
| 7,095,336 | B2 | 8/2006 | Rodgers |
| 7,191,097 | B1 | 3/2007 | Lee et al. |
| 7,304,589 | B2 | 12/2007 | Kagawa |
| 7,317,406 | B2 | 1/2008 | Wolterman |
| 8,694,328 | B1 | 4/2014 | Gormley |
| 9,129,519 | B2 | 9/2015 | Aoude et al. |
| 9,214,084 | B2 | 12/2015 | Grauer |

(Continued)

FOREIGN PATENT DOCUMENTS

| | | |
|---|---|---|
| CA | 2886694 A1 | 9/2016 |
| CA | 2887802 | 10/2016 |

(Continued)

OTHER PUBLICATIONS

PCT Invitation to Pay Additional Fees, and, Where Applicable, Protest Fee, in International Appln. No. PCT/IB2020/058249, dated Dec. 16, 2020, 15 pages.

(Continued)

*Primary Examiner* — Nabil H Syed
*Assistant Examiner* — Cal J Eustaquio
(74) *Attorney, Agent, or Firm* — Fish & Richardson P.C.

(57) ABSTRACT

Among other things, an equipment for use on board a first ground transportation entity has (a) a receiver for information generated by a sensor of the environment of the first ground transportation entity, (b) a processor, and (c) a memory storing instructions executable by the processor to generate and send safety message information to a second ground transportation entity based on the information generated by the sensor.

61 Claims, 18 Drawing Sheets

(56) References Cited

U.S. PATENT DOCUMENTS

| | | |
|---|---|---|
| 9,421,909 B2 | 8/2016 | Strickland et al. |
| 9,460,625 B2 | 10/2016 | Wells |
| 9,505,412 B2 | 11/2016 | Bai et al. |
| 9,558,666 B2 | 1/2017 | Jansson et al. |
| 9,766,626 B1 | 9/2017 | Zhu et al. |
| 9,786,178 B1 | 10/2017 | Bai et al. |
| 9,952,538 B2 | 4/2018 | Nishida et al. |
| 10,007,269 B1 | 6/2018 | Gray |
| 10,163,350 B1 | 12/2018 | Fields |
| 10,235,882 B1 | 3/2019 | Aoude et al. |
| 10,252,721 B1 | 4/2019 | Bai |
| 10,332,395 B1 | 6/2019 | Berg |
| 10,565,880 B2 | 2/2020 | Aoude et al. |
| 10,854,079 B2 | 12/2020 | Aoude et al. |
| 11,257,370 B2 | 2/2022 | Aoude et al. |
| 11,257,371 B2 | 2/2022 | Aoude et al. |
| 11,276,311 B2 | 3/2022 | Aoude et al. |
| 2002/0101360 A1 | 8/2002 | Schrage |
| 2003/0025597 A1 | 2/2003 | Schofield |
| 2003/0149530 A1 | 8/2003 | Stopczynski |
| 2005/0073438 A1 | 4/2005 | Rodgers |
| 2005/0156757 A1 | 7/2005 | Garner |
| 2005/0171663 A1* | 8/2005 | Mittelsteadt ........... G07C 5/008 701/32.6 |
| 2006/0092043 A1 | 5/2006 | Lagassey |
| 2006/0181433 A1 | 8/2006 | Wolterman |
| 2007/0055445 A1* | 3/2007 | Janky ................... H04L 9/3247 701/486 |
| 2007/0096943 A1 | 5/2007 | Arnold |
| 2007/0109146 A1 | 5/2007 | Tengler |
| 2007/0135989 A1* | 6/2007 | Hengst ................... G08G 1/163 701/117 |
| 2007/0276600 A1 | 11/2007 | King et al. |
| 2008/0042825 A1 | 2/2008 | Denny et al. |
| 2008/0068146 A1 | 3/2008 | Cauldwell |
| 2008/0084283 A1 | 4/2008 | Kalik |
| 2008/0114530 A1 | 5/2008 | Petrisor et al. |
| 2008/0312831 A1 | 12/2008 | Greene |
| 2008/0312833 A1 | 12/2008 | Greene |
| 2009/0002195 A1 | 1/2009 | Horvitz |
| 2009/0085770 A1 | 4/2009 | Mergen |
| 2009/0160678 A1 | 6/2009 | Turnbull et al. |
| 2010/0039291 A1 | 2/2010 | Harrrison |
| 2010/0052945 A1 | 3/2010 | Breed et al. |
| 2010/0211310 A1 | 8/2010 | Hotta et al. |
| 2011/0082623 A1 | 4/2011 | Lu |
| 2011/0298603 A1 | 12/2011 | King |
| 2012/0307065 A1 | 12/2012 | Mineault |
| 2013/0141576 A1 | 6/2013 | Lord |
| 2013/0200223 A1 | 8/2013 | Alexander et al. |
| 2013/0253816 A1 | 9/2013 | Caminiti et al. |
| 2014/0032089 A1 | 1/2014 | Aoude et al. |
| 2014/0051346 A1 | 2/2014 | Li |
| 2014/0063196 A1 | 3/2014 | Daniel |
| 2014/0114556 A1* | 4/2014 | Pan ....................... G08G 1/0112 701/119 |
| 2014/0195138 A1 | 7/2014 | Stelzig |
| 2014/0203149 A1 | 7/2014 | Raiser |
| 2014/0307087 A1 | 10/2014 | Evanitsky |
| 2015/0035685 A1 | 2/2015 | Strickland et al. |
| 2016/0027299 A1 | 1/2016 | Raamot |
| 2016/0027300 A1 | 1/2016 | Raamot |
| 2016/0093207 A1 | 3/2016 | Di Censo |
| 2016/0096529 A1 | 4/2016 | Davidsson et al. |
| 2016/0103218 A1 | 4/2016 | Mandava et al. |
| 2016/0105539 A1 | 4/2016 | Maddox et al. |
| 2016/0155334 A1 | 6/2016 | Jansson et al. |
| 2016/0280134 A1 | 9/2016 | Miura |
| 2016/0292997 A1 | 10/2016 | Milne |
| 2016/0300485 A1 | 10/2016 | Ayvaci |
| 2017/0036673 A1 | 2/2017 | Lee |
| 2017/0072853 A1 | 3/2017 | Matsuoka |
| 2017/0166123 A1 | 6/2017 | Bahgat |
| 2017/0214747 A1 | 7/2017 | Schulte et al. |
| 2017/0240110 A1 | 8/2017 | Lopez-Hinojosa et al. |
| 2017/0268896 A1* | 9/2017 | Bai ..................... G01C 21/3697 |
| 2017/0344855 A1 | 11/2017 | Mande |
| 2018/0053102 A1 | 2/2018 | Martinson et al. |
| 2018/0061230 A1 | 3/2018 | Madigan et al. |
| 2018/0096595 A1 | 4/2018 | Janzen et al. |
| 2018/0111611 A1 | 4/2018 | MacNeille |
| 2018/0170400 A1* | 6/2018 | Mahnke ................ G01S 13/878 |
| 2018/0231974 A1 | 8/2018 | Eggert et al. |
| 2018/0257645 A1 | 9/2018 | Buburuzan |
| 2019/0287394 A1 | 9/2019 | Aoude et al. |
| 2019/0287395 A1 | 9/2019 | Aoude et al. |
| 2019/0287401 A1 | 9/2019 | Aoude et al. |
| 2019/0287402 A1 | 9/2019 | Aoude et al. |
| 2019/0287403 A1 | 9/2019 | Aoude et al. |
| 2019/0311614 A1 | 10/2019 | Yang et al. |
| 2019/0325754 A1 | 10/2019 | Aoude et al. |
| 2020/0333468 A1* | 10/2020 | Liu ........................ G01S 19/43 |
| 2020/0388156 A1 | 12/2020 | Aoude et al. |
| 2021/0375138 A1 | 12/2021 | Aoude et al. |

FOREIGN PATENT DOCUMENTS

| | | |
|---|---|---|
| CN | 102700570 | 10/2012 |
| CN | 102700571 | 10/2012 |
| CN | 102756747 | 10/2012 |
| CN | 103646534 | 3/2014 |
| CN | 205621297 U | 10/2016 |
| CN | 106373430 | 2/2017 |
| CN | 106997689 | 8/2017 |
| CN | 107067817 | 8/2017 |
| CN | 105575114 | 4/2018 |
| EP | 2555960 | 10/2011 |
| KR | 10-2013-0050112 | 5/2013 |
| KR | 1020130050112 | 5/2013 |
| WO | WO 2013/104805 | 7/2013 |
| WO | WO 2014/084218 | 6/2014 |
| WO | WO 2016/195566 | 12/2016 |
| WO | WO 2017/030493 | 2/2017 |
| WO | WO 2017/030494 | 2/2017 |
| WO | WO 2017/119964 | 7/2017 |
| WO | WO 2017/171477 | 10/2017 |
| WO | WO 2017/189035 | 11/2017 |

OTHER PUBLICATIONS

PCT International Preliminary Report on Patentability in International Appln. No. PCT/IB2019/052064, dated Sep. 22, 2020, 17 pages.
PCT International Search Report and Written Opinion in International Appln. No. PCT/IB2020/000718, dated Apr. 14, 2021, 13 pages.
PCT International Search Report and Written Opinion in International Appln. No. PCT/IB2020/058249, dated Febmaty 12, 2021, 21 pages.
International Preliminary Report on Patentability in International Appln. No. PCT/IB2020/000718, dated Mar. 10, 2022, 9 pages.
International Preliminary Report on Patentability in International Appln. No. PCT/IB2020/058249, dated Mar. 10, 2022, 13 pages.
Aoude, Georges S., et al., "Driver Behavior Classification at Intersections and Validation on Large Naturalistic Data Set", IEEE Transactions on Intelligent Transportation Systems, vol. 13, No. 2, pp. 724-736, Jun. 2012 (13 pages).
Mandalia, Hiren M., et al., "Using Support Vector Machines For Lane-Change Detection", Drexel University, Philadelphia, PA, Sep. 1, 2005 (5 pages).
PCT International Search Report and Written Opinion in International Application No. PCT/IB2019/052064, dated Sep. 9, 2019, 26 pages.
Sae.org [online], "Cooperative Perception System", published on Sep. 18, 2018, [retrieved on Aug. 12, 2020], retrieved from URL<https://www.sae.org/standards/content/j2945/8/>, 2 pages.

* cited by examiner

ENHANCED ONBOARD EQUIPMENT

This application is entitled to the benefit of the filing date of U.S. provisional patent application 62/893,616, filed Aug. 29, 2019, the entire contents of which are incorporated here by reference.

BACKGROUND

The contents of U.S. Pat. No. 10,235,882 are incorporated here by reference.

This description relates to enhanced onboard equipment.

Collision avoidance systems have become abundant. King et al. (US patent publication 2007/0276600 A1, 2007), for example, described placing sensors ahead of an intersection and applying a physics-based decision rule to predict if two vehicles are about to crash at the intersection based on heading and speed.

In Aoude et al. (U.S. Pat. No. 9,129,519 B2, 2015, the entire contents of which are incorporated here by reference) the behavior of drivers is monitored and modeled to allow for the prediction and prevention of a violation in traffic situations at intersections.

Collision avoidance is the main defense against injury and loss of life and property in ground transportation. Providing early warning of dangerous situations aids collision avoidance.

SUMMARY

In general, in an aspect, an equipment for use on board a first ground transportation entity has (a) a receiver for information generated by a sensor of the environment of the first ground transportation entity, (b) a processor, and (c) a memory storing instructions executable by the processor to generate and send safety message information to a second ground transportation entity based on the information generated by the sensor.

Implementations may include one or a combination of two or more of the following features. The instructions are executable by the processor to generate a prediction for use in generating the safety message information. The prediction is generated by a predictive model. The predictive model is configured to predict a dangerous situation involving the first ground transportation entity, the second ground transportation entity, or another ground transportation entity. The dangerous situation involves a crossing of a lane of a road by the second ground transportation entity. The second ground transportation entity includes a vehicle and the dangerous situation includes a skidding across the lane by the vehicle. The second ground transportation entity includes a pedestrian or other vulnerable road user crossing a road. The vulnerable road user is crossing the road at an intersection. The vulnerable road user is crossing the road other than at an intersection. The predicted dangerous situation includes a predicted collision between a third ground transportation entity and the second ground transportation entity. The first ground transportation entity includes a vehicle and the second ground transportation entity includes a pedestrian or other vulnerable road user. The third ground transportation entity is following the first ground transportation entity and a view of the third ground transportation entity from the first ground transportation entity is occluded. The third ground transportation entity is in a lane adjacent a lane in which the first ground transportation entity is traveling. The instructions are executable by the processor to determine motion parameters of a third ground transportation entity. The second ground transportation entity has only an obstructed view of the third ground transportation. The second ground transportation entity includes a pedestrian or other vulnerable road user. The safety message information sent by the processor includes a basic safety message. The safety message information sent by the processor includes a virtual basic safety message. The safety message information sent by the processor includes a personal safety message. The safety message information sent by the processor includes a virtual personal safety message. The safety message information sent by the processor includes a virtual basic safety message sent on behalf of a third ground transportation entity. The third ground transportation entity includes an unconnected ground transportation entity. The safety message information sent by the processor includes a virtual personal safety message sent on behalf of the third ground transportation entity. The equipment has (d) a receiver for information sent wirelessly from a source external to the first ground transportation entity. The apparatus of claim including the first ground transportation entity. The safety message information includes a virtual intersection collision avoidance message (VICA). The safety message information includes an intersection collision avoidance message (ICA). The safety message information includes a virtual combined safety message (VCSM). The safety message information includes a combined safety message (CSM).

In general, in an aspect, an equipment for use on board a first ground transportation entity has (a) a receiver for first position correction information sent from a source external to the first ground transportation entity, (b) a receiver for information representing a parameter of position or motion of the first ground transportation entity, (c) a processor, and (d) a memory storing instructions executable by the processor to generate updated position correction information based on the first position correction information and on the information representing the parameter of motion, and send a position correction message to another ground transportation entity based on the updated position correction information.

Implementations may include one or a combination of two or more of the following features. The position correction information sent from the source external to the first ground transportation entity includes a position correction message. The position correction information sent from the source external to the first ground transportation entity includes a radio technical commission for Maritime (RTCM) correction message. The position correction information comprises GNSS position correction. The parameter of position or motion includes a current position of the first ground transportation entity. The source external to the first ground transportation entity includes a RSE or an external service configured to transmit RTCM correction messages over the Internet. The instructions are executable by the processor to confirm a level of confidence in the updated position correction information.

In general, in an aspect, information is received that has been generated by a sensor, mounted on a first ground transportation entity, of the environment of the first ground transportation entity. Safety message information is generated and sent to a second ground transportation entity based on the information generated by the sensor.

Implementations may include one or a combination of two or more of the following features. A prediction is generated for use in generating the safety message information. The prediction is generated by a predictive model. The predictive model is configured to predict a dangerous situation involving the first ground transportation entity, the second ground transportation entity, or another ground transportation entity. The dangerous situation involves a crossing of a lane of a road by the second ground transportation entity. The second ground transportation entity includes a vehicle and the dangerous situation includes a skidding across the lane by the vehicle. The second ground transportation entity includes a pedestrian or other vulnerable road user crossing a road. The vulnerable road user is crossing the road at an intersection. The vulnerable road user is crossing the road other than at an intersection. The dangerous situation includes a collision between a third ground transportation entity and the second ground transportation entity. The first ground transportation entity includes a vehicle and the second ground transportation entity includes a pedestrian or other vulnerable road user. The third ground transportation entity is following the first ground transportation entity and a view of the third ground transportation entity from the first ground transportation entity is occluded. The third ground transportation entity is in a lane adjacent a lane in which the first ground transportation entity is traveling. Motion parameters of a third ground transportation entity are determined. The second ground transportation entity has only an obstructed view of the third ground transportation. The second ground transportation entity includes a pedestrian or other vulnerable road user. The safety message information includes a basic safety message. The safety message information includes a virtual basic safety message. The safety message information includes a personal safety message. The safety message information includes a virtual personal safety message. The safety message information includes a virtual basic safety message sent on behalf of a third ground transportation entity. The safety message information sent by the processor includes a virtual personal safety message sent on behalf of the third ground transportation. The third ground transportation entity includes an unconnected ground transportation entity. Information is received that has been sent wirelessly from a source external to the first ground transportation entity. The safety message information includes a virtual intersection collision avoidance message (VICA). The safety message information includes a virtual intersection collision avoidance message (ICA). The safety message information includes a virtual combined safety message (VCSM). The safety message information includes a combined safety message (CSM).

In general, in an aspect, first position correction information is received that has been sent from a source external to a first ground transportation entity. Information is received representing a parameter of motion of the first ground transportation entity. Updated position correction information is generated based on the first position correction information and on the information representing the parameter of motion. The position correction message is sent and sending a position correction message to another ground transportation entity based on the updated position correction information.

Implementations may include one or a combination of two or more of the following features. The position correction information sent from the source external to the first ground transportation entity includes a position correction message. The position correction information sent from the source external to the first ground transportation entity includes a radio technical commission for Maritime (RTCM) correction message. The position correction information includes GNSS position correction. The parameter of motion includes a current position of the first ground transportation entity. The source external to the first ground transportation entity includes a RSE or an external service configured to transmit position correction messages over the Internet. A level of confidence in the updated position correction information it is confirmed.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

FIGS. 1, 2, 3, and 15 are block diagrams.

FIGS. 4, 5, 8 through 11, 13, 14, and 17 through 23 are schematic views of road networks from above.

Figure 1:
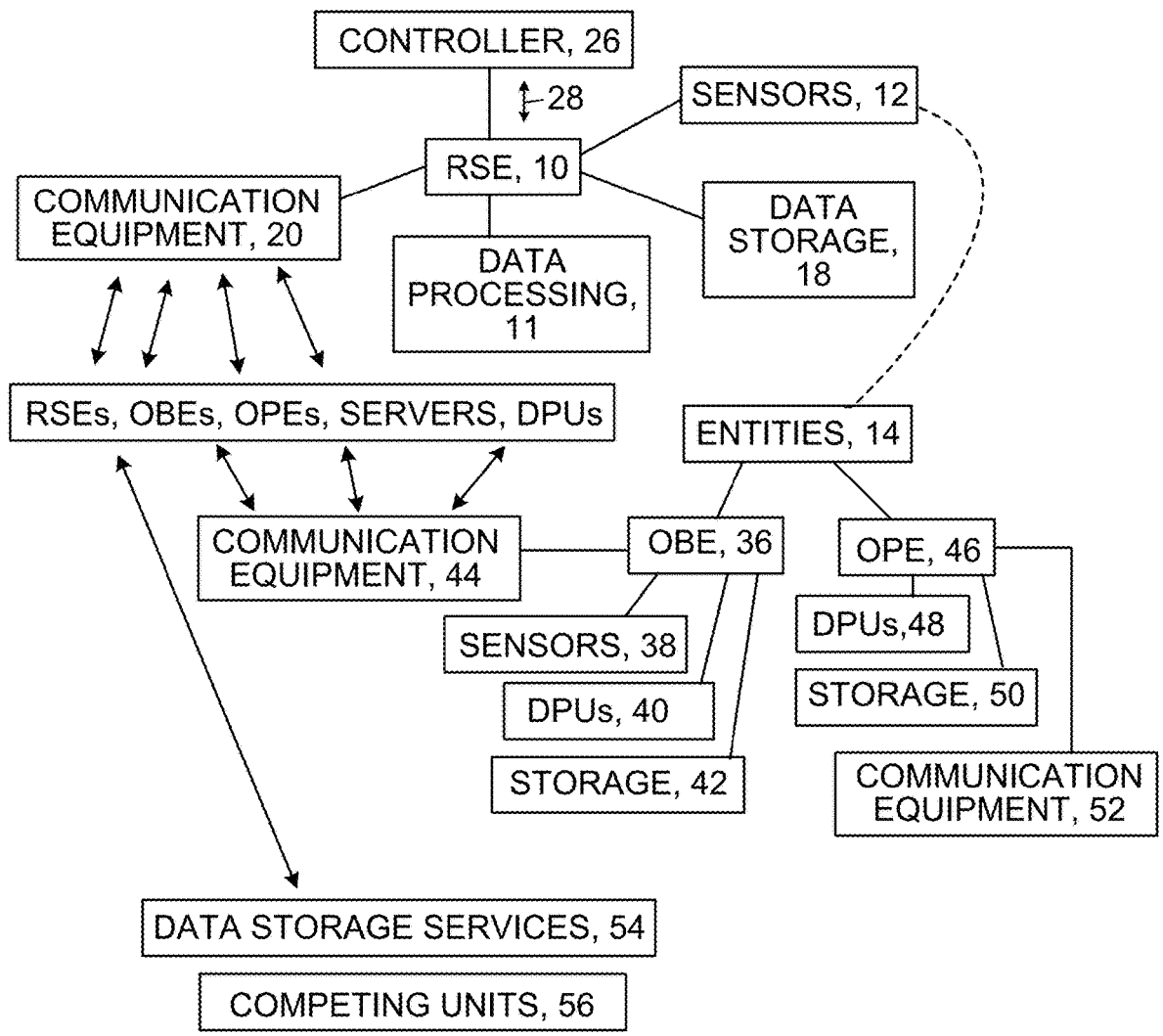

With advancements in sensor technologies and computers, it has become feasible to predict (and to provide early warning of) dangerous situations and in that way to prevent collisions and near misses of ground transportation entities (that is, to enable collision avoidance) in the conduct of ground transportation.

We use the term "ground transportation" broadly to include, for example, any mode or medium of moving from place to place that entails contact with the land or water on the surface of the earth, such as walking or running (or engaging in other pedestrian activities), non-motorized vehicles, motorized vehicles (autonomous, semi-autonomous, and non-autonomous), and rail vehicles.

We use the term "ground transportation entity" (or sometimes simply "entity") broadly to include, for example, a person or a discrete motorized or non-motorized vehicle engaged in a mode of ground transportation, such as a pedestrian, bicycle rider, boat, car, truck, tram, streetcar, or train, among others. Sometimes we use the terms "vehicle" or "road user" as shorthand references to a ground transportation entity.

We use the term "dangerous situation" broadly to include, for example, any event, occurrence, sequence, context, or other situation that may lead to imminent property damage or personal injury or death and that may be reducible or avoidable. We sometimes use the term "hazard" interchangeably with "dangerous situation." We sometimes use the word "violation" or "violate" with respect to behavior of an entity that has, may, or will lead to a dangerous situation.

In some implementations of the technology that we discuss here a ground transportation network is being used by a mix of ground transportation entities that do not have or are not using transportation connectivity and ground transportation entities that do have and are using transportation connectivity.

We use the term "connectivity" broadly to include, for example, any capability a ground transportation entity to (a) be aware of and act on knowledge of its surroundings, other ground transportation entities in its vicinity, and traffic situations relevant to it, (b) broadcast or otherwise transmit data about its state, or (c) both (a) and (b). The data transmitted can include its location, heading, speed, or internal states of its components relevant to a traffic situation. In some cases, the awareness of the ground transportation entity is based on wirelessly received data about other ground transportation entities or traffic situations relevant to the operation of the ground transportation entity. The received data can originate from the other ground transportation entities or from infrastructure devices, or both. Typically connectivity involves sending or receiving data in real time or essentially real time or in time for one or more of the ground transportation entities to act on the data in a traffic situation.

We use the term "traffic situation" broadly to include any circumstance in which two or more ground transportation entities are operating in the vicinity of one another and in which the operation or status of each of the entities can affect or be relevant to the operation or status of the others.

We sometimes refer to a ground transportation entity that does not have or is not using connectivity or aspects of connectivity as a "non-connected ground transportation entity" or simply a "non-connected entity." We sometimes refer to a ground transportation entity that has and is using connectivity or aspects of connectivity as a "connected ground transportation entity" or simply a "connected entity."

We sometimes use the term "cooperative entity" to refer to a ground transportation entity that broadcasts data to its surroundings including location, heading, speed, or states of on board safety systems (such brakes, lights, and wipers), for example.

We sometimes use the term "non-cooperative entity" to refer to a ground transportation entity that does not broadcast to its surroundings one or more types of data, such as its location, speed, heading, or state.

We sometimes use the term "vicinity" of a ground transportation entity broadly to include, for example, an area in which a broadcast by the entity can be received by other ground transportation entities or infrastructure devices. In some cases, the vicinity varies with location of the entity and the number and characteristics of obstacles around the entity. An entity traveling on an open road in a desert will have a very wide vicinity since there are no obstacles to prevent a broadcast signal from the entity from reaching long distances. Conversely, the vicinity in an urban canyon will be diminished by the buildings around the entity. Additionally, there may be sources of electromagnetic noise that degrade the quality of the broadcast signal and therefore the distance of reception (the vicinity).

Figure 14:
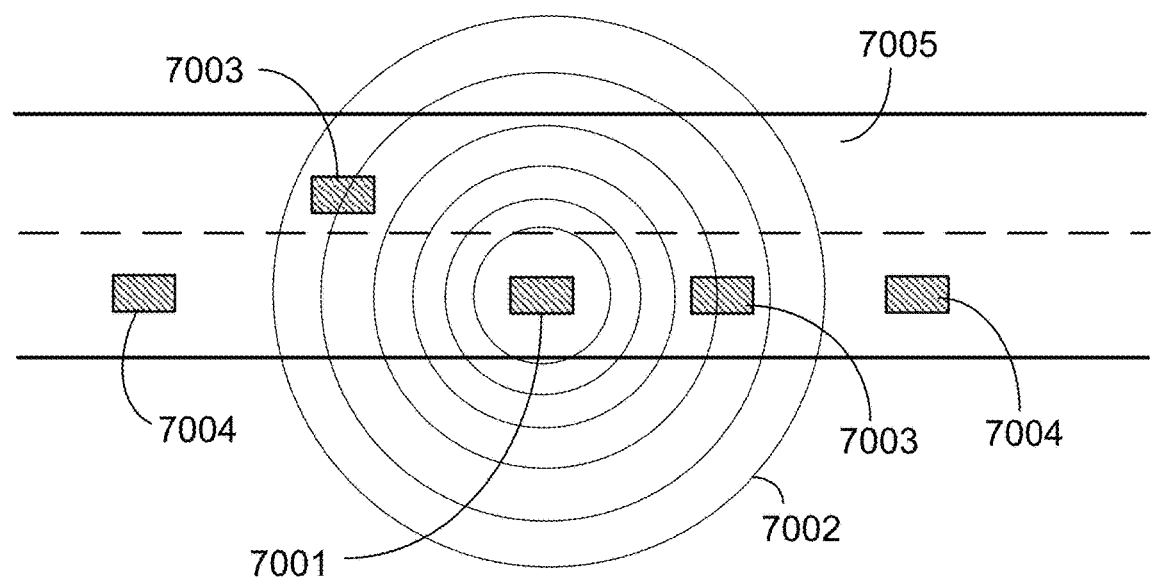

As shown in FIG. 14, the vicinity of an entity 7001 traveling along a road 7005 can be represented by concentric circles with the outermost circle 7002 representing the outermost extent of the vicinity. Any other entity that lies within the circle 7002 is in the vicinity of entity 7001. Any other entity that lies outside the circle 7002 is outside the vicinity of, and unable to receive a broadcast by, the entity 7001. The entity 7001 would be invisible to all entities and infrastructure devices outside its vicinity.

Typically, cooperative entities are continuously broadcasting their state data. Connected entities in the vicinity of a broadcasting entity are able to receive these broadcasts and can process and act on the received data. If, for example, a vulnerable road user has a wearable device that can receive broadcasts from an entity, say an approaching truck, the wearable device can process the received data and let the vulnerable user know when it is safe to cross the road. This operation occurs without regard to the locations of the cooperative entity or the vulnerable user relative to a "smart" intersection as long as the user's device can receive the broadcast, i.e., is within the vicinity of the cooperative entity.

We use the term "vulnerable road users" or "vulnerable road users" broadly to include, for example, any user of roadways or other features of the road network who is not using a motorized vehicle. vulnerable road users are generally unprotected against injury or death or property damage if they collide with a motorized vehicle. In some examples, vulnerable road users could be people walking, running, cycling or performing any type of activity that puts them at risk of direct physical contact by vehicles or other ground transportation entities in case of a collisions.

In some implementations, the collision avoidance technologies and systems described in this document (which we sometimes refer to simply as the "system") use sensors mounted on infrastructure fixtures to monitor, track, detect, and predict motion (such as speed, heading, and position), behavior (e.g., high speed), and intent (e.g., will violate the stop sign) of ground transportation entities and drivers and operators of them. The information provided by the sensors ("sensor data") enables the system to predict dangerous situations and provide early warning to the entities to increase the chances of collision avoidance.

We use the term "collision avoidance" broadly to include, for example, any circumstance in which a collision or a near miss between two or more ground transportation entities or between a ground transportation entity and another object in the environment that may result from a dangerous situation, is prevented or in which chances of such an interaction are reduced.

We use the term "early warning" broadly to include, for example, any notice, alert, instruction, command, broadcast, transmission, or other sending or receiving of information that identifies, suggests, or is in any way indicative of a dangerous situation and that is useful for collision avoidance.

Road intersections are prime locations where dangerous situations can happen. The technology that we describe here can equip intersections with infrastructure devices including sensors, computing hardware and intelligence to enable simultaneous monitoring, detection, and prediction of dangerous situations. The data from these sensors is normalized to a single frame of reference and then is processed. Artificial intelligence models of traffic flow along different approaches to the intersection are constructed. These models help, for example, entities that are more likely to violate traffic rules. The models are set up to detect the dangerous situations before the actual violations and therefore can be considered as predictions. Based on a prediction of a dangerous situation, an alert is sent from the infrastructure devices at the intersection to all connected entities in the vicinity of the intersection. Every entity that receives an alert, processes the data in the alert and performs alert filtering. Alert filtering is a process of discarding or disregarding alerts that are not beneficial to the entity. If an alert is considered beneficial (i.e., is not disregarded as a result of the filtering), such as an alert of an impending collision, the entity either automatically reacts to the alert (such as by applying brakes), or a notification is presented to the driver or both.

The system can be used on, but is not limited to, roadways, waterways, and railways. We sometimes refer to these and other similar transportation contexts as "ground transportation networks."

Although we often discuss the system in the context of intersections, it can also be applied to other contexts.

We use the term "intersection" broadly to include, for example, any real-world arrangement of roads, rails, water bodies, or other travel paths for which two or more ground transportation entities traveling along paths of a ground transportation network could at some time and location occupy the same position producing a collision.

The ground transportation entities using a ground transportation network move with a variety of speeds and may reach a given intersection at different speeds and times of the day. If the speed and distance of an entity from the intersection is known, dividing the distance by the speed (both expressed in the same unit system) will give the time of arrival at the intersection. However, since the speed of will change due, for example, to traffic conditions, speed limits on the route, traffic signals, and other factors, the expected time of arrival at the intersection changes continuously. This dynamic change in expected time of arrival makes it impossible to predict the actual time of arrival with 100% confidence.

To account for the factors affecting the motion of an entity requires applying a large number of relationships between the speed of the entity and the various affecting factors. The absolute values of the state of motion of an entity can be observed by a sensor tracking that entity either from the entity or from an external location. The data captured by these sensors can be used to model the patterns of motion, behaviors, and intentions of the entities. Machine learning can be used to generate complex models from vast amounts of data. Patterns that cannot be modeled using kinematics of the entities directly can be captured using machine learning. A trained model can predict whether an entity is going to move or stop at a particular point by using that entity's tracking data from the sensors tracking them.

In other words, in addition to detecting information about ground transportation entities directly from the sensor data, the system uses artificial intelligence and machine learning to process vast amounts of sensor data to learn the patterns of motion, behaviors, and intentions of ground transportation entities, for example, at intersections of ground transportation networks, on approaches to such intersections, and at crosswalks of ground transportation networks. Based on the direct use of current sensor data and on the results of applying the artificial intelligence and machine learning to the current sensor data, the system produces early warnings such as alerts of dangerous situations and therefore aids collision avoidance. With respect to early warnings in the form of instructions or commands, the command or instruction could be directed to a specific autonomous or human-driven entity to control the vehicle directly. For example, the instruction or command could slow down or stop an entity being driven by a malevolent person who has been determined to be about to run a red light for the purpose of trying to hurt people.

The system can be tailored to make predictions for that particular intersection and to send alerts to the entities in the vicinity of the device broadcasting the alerts. For this purpose, the system will use sensors to derive data about the dangerous entity and pass the current readings from the sensors through the trained model. The output of the model then can predict a dangerous situation and broadcast a corresponding alert. The alert, received by connected entities in the vicinity, contains information about the dangerous entity so that the receiving entity can analyze that information to assess the threat posed to it by the dangerous entity. If there is a threat, the receiving entity can either take action itself (e.g., slowing down) or notify the driver of the receiving entity using a human machine interface based on visual, audio, haptic, or any kind of sensory stimulation. An autonomous entity may take action itself to avoid a dangerous situation.

The alert can also be sent directly through the cellular or other network to a mobile phone or other device equipped to receive alerts and possessed by a pedestrian. The system identifies potential dangerous entities at the intersection and broadcasts (or directly sends) alerts to a pedestrian's personal device having a communication unit. The alert may, for example, prevent a pedestrian from entering a crosswalk and thus avoid a potential accident.

The system can also track pedestrians and broadcast information related to their state (position, speed, and other parameters) to the other entities so that the other entities can take action to avoid dangerous situations.

As shown in FIG. 1, the system includes at least the following types of components:

1. Roadside Equipment (RSE) 10 that includes or makes use of sensors 12 to monitor, track, detect, and predict motion (such as speed, heading, and position), behavior (e.g., high speed), and intent (e.g., will violate the stop sign) of ground transportation entities 14. The RSE also includes or can make use of a data processing unit 11 and data storage 18. The ground transportation entities exhibit a wide range of behavior which depends on the infrastructure of the ground transportation network as well as the states of the entities themselves, the states of the drivers, and the states of other ground transportation entities. To capture the behaviors of the entities the RSE collects information from the sensors, other RSEs, OBEs, OPEs, local or central servers, and other data processing units. The RSE also saves the data received by it as well as may save the processed data at some or all the steps in the pipeline.

The RSE may save the data on a local storage device or a remote storage. The collected data is processed in real time using predefined logic or logic based on the data collected dynamically which means that the RSE can update its own logic automatically. The data can be processed over a single processing unit or a cluster of processing units to get results faster. The data can be processed on a local or remote processing unit or a local or remote cluster of processing units. The RSE can use a simple logic or a sophisticated model trained on the collected data. The model can be trained locally or remotely.

The RSE may preprocess data before using the trained model to filter outliers. The outliers can be present due to noise in the sensor, reflections or due to some other artifact. The resulting outliers can lead to false alarms which can affect the performance of the whole RSE. The filtration methods can be based on the data collected by the RSE, OBEs, OPEs, or online resources. The RSE may interface with other controllers such as traffic light controllers at the intersection or other location to extract information for use in the data processing pipeline.

The RSE also includes or can make use of communication equipment 20 to communicate by wire or wireless with other RSEs, and with OBEs, OPEs, local or central servers, and other data processing units. The RSE can use any available standard for communication with other equipment. The RSE may use wired or wireless Internet connections for downloading and uploading data to other equipment, the cellular network to send and receive messages from other cellular devices, and a dedicated radio device to communicate to infrastructure devices and other RSEs at the intersection or other location.

An RSE can be installed next to different kinds of intersections. For example, at a signalized intersection (e.g., an intersection in which traffic is controlled by a light), an RSE 10 is installed near the traffic light controllers 26 either in the same enclosure or within a nearby enclosure. Data (such as traffic light phase and timing) is meant to flow 28 between the traffic light controllers and the RSE. At a non-signalized intersection, the RSE 10 is usually located to make it easy to connect it to the sensors 12 that are used to monitor the roads or other features of the ground transportation network in the vicinity of the intersection. The proximity of RSE with the intersection helps in maintaining a low latency system which is crucial for providing maximum time to the receiving ground units to respond to an alert.

2. Onboard Equipment (OBE) 36 mounted on or carried by or in the ground transportation entities 14, which includes sensors 38 that determine location and kinematics (motion data) of the entities in addition to safety related data about the entities. OBEs also include data processing units 40, data storage 42, and communication equipment 44 that can communicate wirelessly with other OBEs, OPEs, RSEs, and possibly servers and computing units.

3. On Person Equipment (OPE) 46 which can be, but is not limited to, a mobile phone, wearable device, or any other device that is capable of being worn by, held by, attached to, or otherwise interfacing with a person or animal. OPEs can include or be coupled to data processing units 48, data storage 50, and communication equipment 52 if needed. In some implementations, an OPE serves as a dedicated communication unit for a non-vehicular vulnerable road user. In some cases, the OPE can also be used for other purposes. The OPE may have a component to provide visual, audio, or haptic alerts to the vulnerable road user.

Vulnerable road user can include pedestrians, cyclists, road workers, people on wheelchairs, scooters, self-balancing devices, battery powered personal transporters, animal driven carriages, guide or police animals, farm animals, herds, and pets.

Typically an OPE is in the possession of the vulnerable road user and is capable of sending and receiving messages. An OPE can be attached to or integrated with a mobile phone, tablet, personal transporter, bicycle, wearable device (watch, bracelet, anklet, for example), or attached to a pet collar.

Messages sent by an OPE can include kinematic information associated with the vulnerable road user including, but not limited to, time of day, 3D position, heading, velocity, and acceleration. Sent messages can also carry data representing the alertness level, current behavior, and future intents of the vulnerable road user, e.g. that the vulnerable road user is currently crossing the crosswalk, is listening to music, or is going to cross the crosswalk. Among other things, the message may convey the blob size or data size of the vulnerable road user, whether there are external devices with the vulnerable road user (e.g., a stroller, a cart, or other device), whether the vulnerable road user has a disability or is using any personal assistance. The message may convey the category of worker if the vulnerable road user is a worker and may also describe the type of activity being done by the worker. When a cluster of similar vulnerable road users (say, a group of pedestrians) have similar characteristics, a single message can be sent to avoid multiple message broadcasts.

Typically, the messages received by an OPE are alert messages from a roadside equipment or from an entity. The OPE can act on the received messages by alerting the vulnerable road user. The alert message will carry data useful in providing a custom alert for the vulnerable road user. For example, the alert to the vulnerable road user may showcase a type of dangerous situation and suggest possible actions. The OPE can apply alert filtering to all received messages and present only relevant messages to the vulnerable road user.

Alert filtering is based on the outcome of applying a learning algorithm to historical data associated with the OPE which enables custom-tailoring the alert filtering to each vulnerable road user. The OPE learning algorithm tracks the responses of the vulnerable road user to received alerts and tailors future alerts to attain the best response time and the best attention from vulnerable road user. The learning algorithm can also be applied to data carried in sent messages.

4. Data storage servers 54 which can be but are not limited to cloud storage, local storage, or any other storage facility that allows for storage and retrieval of data. The data storage servers are accessible by RSEs, computing units, and potentially by OBEs, OPEs, and data servers, for the purpose of storing data related to early warning and collision avoidance, for example. The data storage servers are accessible from RSEs and potentially from OBEs, OPEs, and data servers, for the purpose of fetching stored data. The data can be raw sensor data, processed data by a processing unit or any other information generated by the RSEs, OBEs and OPEs.

Sensors at an intersection, which monitor ground transportation entities continuously, can generate a large amount of data every day. The volume of this data depends on the number and types of the sensors. The data is both processed in real time and saved for future analysis requiring data storage units (e.g., hard disk drives, solid state drives, and other mass storage devices) locally such as at the intersection. The local storage devices will get filled up in a period depending on their storage capacity, the volume of generated data, and the rate at which it is generated. To preserve the data for future use, the data is uploaded to a remote server which has a lot more capacity. The remote server may upgrade the storage capacity on demand as needed. The remote server may use a data storage device similar to the local storage (e.g., a hard disk drive, a solid state drive, or other mass storage device) accessible through a network connection.

The data stored locally and on the server for future analysis may include the data broadcast by the ground transportation entities and received by the RSE which is saved for future analysis. The stored data can be downloaded from the servers or other remote source for processing on the RSE. For example, the machine learning model of the intersection where the RSE is located may be stored at the server or in other remote storage, and downloaded by the RSE to use for analyzing the current data received at the RSE from local sources.

5. Computing units 56 which are powerful computing machines located in the cloud or locally (for example as part of an RSE) or a combination of those. Among other functions, the computing units process the available data to generate predictions, machine learning based models of motions, behaviors, and intents of the vehicles, pedestrians, or other ground transportation entities using the transportation network. Each of the computing unites can have dedicated hardware to process corresponding types of data (e.g., a graphics processing unit for processing images). In case of heavy processing loads, the computing unit in the RSE may become overloaded. This may happen, for example, when additional data generation units (e.g. sensors) are added to the system producing a computational overload. The overload can also occur if the logic running in the computing unit is replaced with more computationally intensive logic. An overload may be caused by an increase in the number of ground transportation entities being tracked. When a local computational overload happens, the RSE can offload some of the tasks to another computing unit. The other computing unit could be nearby the RSE or remote, such as a server. Computational tasks can be prioritized and tasks which are not time critical can be completed at the other computing unit and the results retrieved by the local computing unit. For example, the computing unit in the RSE can request another computing unit to run a job for analyzing saved data and training a model using the data. The trained model will then be downloaded by the computing unit at the RSE to store and use there.

The computing unit at the RSE can use a other small computing units to perform a computationally intensive job more efficiently and saving time. The available computing units are used wisely to perform the most tasks in the least time, for example, by dividing the tasks between the RSE computing units and the other available computing units. A computing unit can also be attached as an external device to an RSE to add more computational capability to the computing unit in the RSE. The externally attached computing unit can have the same or a different architecture as compared to the computing unit in the RSE. The externally attached computing unit may communicate with the existing computing unit using any available communication port. The RSE computing unit can request more computational power from the external computing unit as needed.

The rest of this document will explain in detail the roles and functions of the components above in the system, among other things.

Roadside Equipment (RSE)

Figure 2:
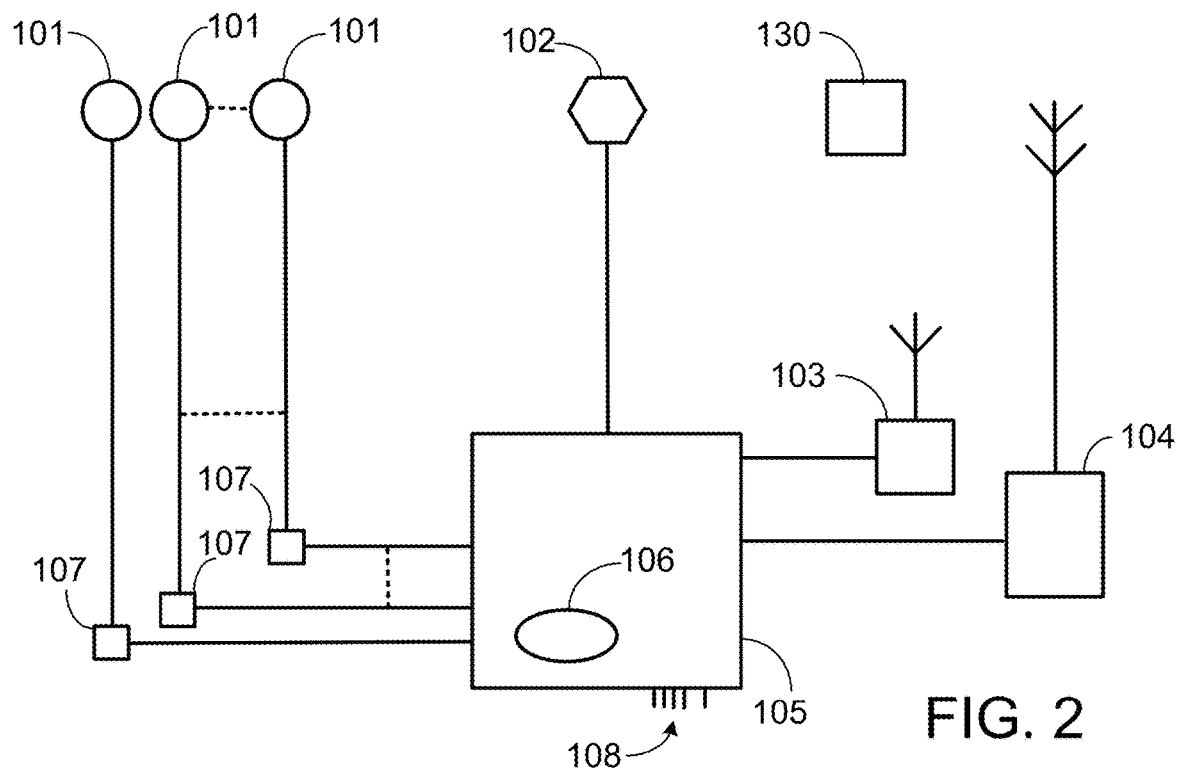

As shown in FIG. 2, an RSE may include, but not be limited to, the following components:

1. One or more communication units 103, 104 which enable the reception or transmission or both of motion data and other data related to ground transportation entities and traffic safety data, from and to nearby vehicles or other ground transportation entities, infrastructure, and remote servers and data storage systems 130. In some cases, this type of communication is known as infrastructure-to-everything (I2X), which includes but is not limited to infrastructure-to-vehicles (I2V), infrastructure-to-pedestrians (I2P), infrastructure-to-infrastructure (121), and infrastructure-to-devices (I2D), and combinations of them. The communication may be wireless or wired and comply with a wide variety of communication protocols.

2. Communication unit 103 is used for communication with ground transportation entities and unit 104 is used for communication through the Internet with remote servers and data storage systems 130.

3. Local storage 106 for storing programs, intersection models, and behavior and traffic models. It may also be used for temporary storage of data collected from the sensors 101.

4. Sensors 101 and sensor controllers 107 which allow for the monitoring of (e.g., generating of data about) moving subjects such as ground transportation entities typically near the RSE. The sensors may include, but are not limited to, cameras, radars, lidars, ultrasonic detectors or any other hardware that can sense or infer from sensed data the distance to, speed, heading, location, or combinations of them, among other things, of a ground transportation entity. Sensor fusion is performed using aggregations or combinations of data from two or more sensors 101.

5. A location receiver (102) (such as a GPS receiver) that provides localization data (e.g., coordinates of the location of the RSE)) and helps with correcting localization errors in the localization of ground transportation entities.

6. A processing unit 105 that will acquire and use the data generated from the sensors as well as incoming data from the communication units 103, 104. The processing unit will process and store the data locally and, in some implementations, transmit the data for remote storage and further processing. The processing unit will also generate messages and alerts that are broadcast or otherwise sent through wireless communication facilities to nearby pedestrians, motor vehicles, or other ground transportation entities, and in some cases to signs or other infrastructure presentation devices. The processing unit will also periodically report the health and status of all the RSE systems to a remote server for monitoring.

7. Expansion connector 108 that allows for control and communication between the RSE and other hardware or other components such has temperature and humidity sensors, traffic light controllers, other computing units as described above, and other electronics that may become available in the future.

Onboard Equipment (OBE)

Figure 3:
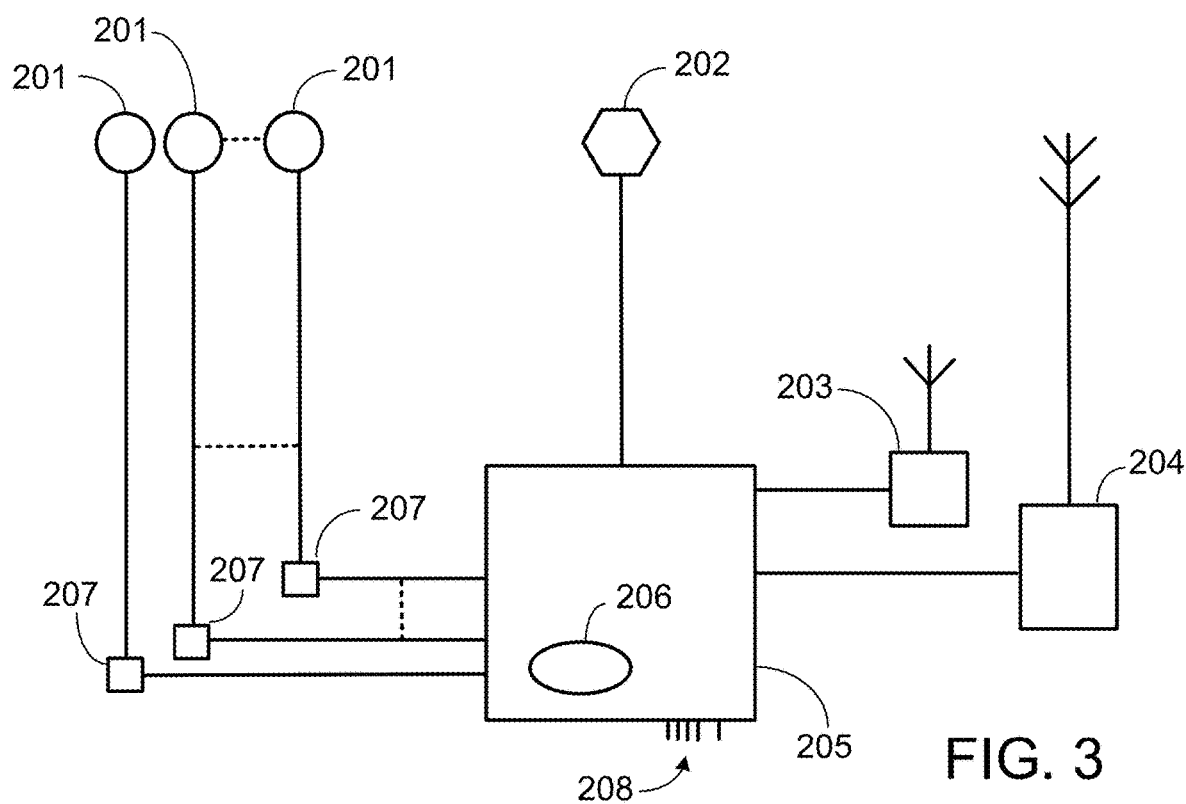

The onboard equipment typically may be original equipment for a ground transportation entity or added to the entity by a third-party supplier. As shown in FIG. 3, OBE may include, but is not limited to, the following components:

1. A communication unit 203 that enables the sending and receiving, or both, of data to and from nearby vehicles, pedestrians, cyclists, or other ground transportation entities, and infrastructure, and combinations of them. The communication unit also allows for the transmission or reception (or both) of data between the vehicle or other ground transportation entity and a local or remote server 212 for machine learning purposes and for remote monitoring of the ground transportation entity by the server. In some cases, this type of communication is known as vehicle-to-everything (V2X), which includes but is not limited to vehicles-to-vehicles (V2V), vehicles-to-pedestrians (V2P), vehicle-to-infrastructure (V2I), vehicle-to-devices V2D), and combinations of them. The communication may be wireless or wired and comply with a wide variety of communication protocols.

Communication unit 204 will allow the OBE to communicate through the Internet with remote servers for program update, data storage and data processing.

2. Local storage 206 for storing programs, intersection models, and traffic models. It may also be used for temporary storage of data collected from the sensors 201.

3. Sensors 201 and sensor controllers 207 that may include, but are not limited to, external cameras, lidars, radars, ultrasonic sensors or any device that may be used to detect nearby objects or people or other ground transportation entities. Sensors 201 may also include additional kinematic sensors, global positioning receivers, and internal and local microphones and cameras.

4. A location receiver 202 (such as a GPS receiver) that provides localization data (e.g., coordinates of the location of the ground transportation entity).

5. A processing unit 205 which acquires, uses, generates, and transmits data, including consuming data from and sending data to the communication unit as well as consuming data from sensors in or on the ground transportation entity.

6. Expansion connectors 208 that allows for control and communication between the OBE and other hardware.

7. An interface unit that can be retrofit or integrated into a head-unit, steering wheel, or driver mobile device in one or more ways such as using visual, audible, or haptic feedback).

Smart OBE (SOBE)

In a world where all vehicles and other ground transportation entities are connected entities, each vehicle or other ground transportation entity could be a cooperative entity with the others and could report its current location, safety status, intent, and other information to the others. Presently, almost all vehicles are not connected entities, cannot report such information to other ground transportation entities, and are operated by people with different levels of skill, well-being, stress, and behavior. Without such connectivity and communication, predicting a vehicle's or ground transportation entity's next move becomes difficult and that translates to a diminished ability to implement collision avoidance and to provide early warnings.

A smart OBE monitors the surroundings and users or occupants of the ground transportation entity. It also keeps tabs on the health and status of the different systems and subsystems of the entity. The SOBE monitors the external world by listening to, for example, the radio transmissions from emergency broadcasts, traffic and safety messages from nearby RSE, and messages about safety, locations, and other motion information from other connected vehicles or other ground transportation entities. The SOBE also interfaces with on board sensors that can watch the road and driving conditions such as cameras, range sensors, vibration sensors, microphones, or any other sensor that allows of such monitoring. A SOBE will also monitor the immediate surroundings and create a map of all the static and moving objects.

A SOBE can also monitor the behavior of the users or occupants of the vehicle or other ground transportation entity. The SOBE uses microphones to monitor the quality of the conversation. It can also use other sensors such as seating sensors, cameras, hydrocarbon sensors, and sensors of volatile organic compounds and other toxic materials. It can also use kinematic sensors to measure the reaction and behavior of the driver and, from that, infer the quality of driving.

SOBE also receives vehicle-to-vehicle messages (e.g., basic safety messages (BSMs)) from other ground transport entities and vehicle-to-pedestrian messages (e.g., personal safety messages (PSMs)) from vulnerable road users.

The SOBE will then fuse the data from this array of sensors, sources, and messages. It will then apply the fused data to an artificial intelligence model that is not only able to predict the next action or reaction of the driver or user of the vehicle or other ground transportation entity or vulnerable road user, but also be able to predict the intent and future trajectories and associated near-miss or collision risks due to other vehicles, ground transportation entities and vulnerable road users nearby. For example, an SOBE can use the BSMs received from a nearby vehicle to predict that the nearby vehicle is about to enter into a lane change maneuver that creates a risk to its own host vehicle, and can alert the driver of an imminent risk. The risk is computed by the SOBE based on the probability of the various future predicted trajectories of the nearby vehicle (e.g., going straight, changing lane to the right, changing lane to the left), and the associated risk of collision with the host vehicle for each of those trajectories. If the risk of collision is higher than a certain threshold, then the warning is displayed to the driver of the host vehicle.

Machine learning is typically required to predict intent and future trajectories due to the complexity of human driver behavior modeling, which is further impacted by external factors (e.g., changing environmental and weather conditions).

A SOBE is characterized by having powerful computational abilities to be able to process the large number of data feeds some of which provide megabytes of data per second. The quantity of data available is also proportional to the level of detail required from each sensor.

A SOBE will also have powerful signal processing equipment to be able to pull useful information from an environment that is known to have high (signal) noise levels and low signal to noise ratios. SOBE will also protect the driver from the massive number of alerts that the vehicle is receiving by providing smart alert filtering. The alert filtering is the result of the machine learning model which will be able to tell which alert is important in the current location, environmental conditions, driver behavior, vehicle health and status, and kinematics.

Smart OBEs are important for collision avoidance and early warning and for having safer transportation networks for all users and not only for the occupants or users of vehicles that include SOBEs. SOBEs can detect and predict the movements of the different entities on the road and therefore aid collision avoidance.

On Person Equipment (OPE)

As mentioned earlier, on person equipment (OPE) includes any device that may be held by, attached to, or otherwise interface directly with a pedestrian, jogger, or other person who is a ground transportation entity or otherwise present on or making use of a ground transportation network. Such a person may be vulnerable road user susceptible to being hit by a vehicle, for example. OPEs may include, but not be limited to, mobile devices (for example, smart phones, tablets, digital assistants), wearables (e.g., eyewear, watches, bracelets, anklets), and implants. Existing components and features of OPEs can be used to track and report location, speed, and heading. An OPE may also be used to receive and process data and display alerts to the user in various modes (visual, sound, haptic, for example).

Honda has developed a communication system and method for V2P applications focused on direct communication between a vehicle and a pedestrian using OPEs. In one case, the vehicle is equipped with an OBE to broadcast a message to a surrounding pedestrian's OPE. The message carries the vehicle's current status including vehicle parameters, speed, and heading, for example. For example, the message could be a basic safety message (BSM). If needed the OPE will present an alert to the pedestrian, tailored to the pedestrian's level of distraction, about a predicted dangerous situation in order to avoid a collision. In another case, the pedestrian's OPE broadcasts a message (such as a personal safety message (PSM)) to a surrounding vehicle's OBE that the pedestrian might cross the vehicle's intended path. If needed, the vehicle's OBE will display an alert to the vehicle user about a predicted hazard in order to avoid a collision. See Strickland, Richard Dean, et al. "Vehicle to pedestrian communication system and method." U.S. Pat. No. 9,421, 909.

The system that we describe here, uses an I2P or I2V approach using sensors external to the vehicle and the pedestrian (mainly on infrastructure) to track and collect data on pedestrians and other vulnerable road users. For example the sensors can track pedestrians crossing a street and vehicles operating at or near the crossing place. The data collected will in turn be used to build predictive models of pedestrian and vehicle driver intents and behaviors on roads using rule-based and machine learning methods. These models will help analyze the data collected and make predictions of pedestrian and vehicle paths and intents. If a hazard is predicted, a message will be broadcast from the RSE to the OBE or the OPE or both, alerting each entity of the intended path of the other and allowing each of them to take a pre-emptive action with enough time to avoid the collision.

Remote Computing (Cloud Computing and Storage)

The data collected from the sensors connected to or incorporated in the RSEs, the OBEs, and the OPEs needs to be processed so that effective mathematical machine learning models can be generated. This processing requires a lot of data processing power to reduce the time needed to generate each model. The required processing power is much more than what is typically available locally on the RSE. To address this, the data can be transmitted to a remote computing facility that provides the power needed and can scale on demand. We refer to the remote computing facility as a "remote server" which aligns with the nomenclature used in computing literature. In some cases, it may be possible to perform part or all of the processing at the RCEs by equipping them with high-powered computing capabilities.

Rule Based Processing

Unlike artificial intelligence and machine learning techniques, rule-based processing can be applied at any time without the need for data collection, training, and model building. Rule-based processing can be deployed from the beginning of operation of the system, and that it what is typically done, until enough training data has been acquired to create machine learning models. After a new installation, rules are setup to process incoming sensor data. This is not only useful to improve road safety but also is a good test case to make sure that all the components of the system are working as expected. Rule based processing can be also added and used later as an additional layer to capture rare cases for which machine learning might not able to make accurate predictions. Rule-based approaches are based on simple relationships between collected data parameters (e.g., speed, range, and others). Rule-based approaches could also provide a baseline for the assessment of the performance of machine learning algorithms.

In rule-based processing, a vehicle or other ground transportation entity traversing part of a ground transportation network is monitored by sensors. If its current speed and acceleration exceed a threshold that would prevent it from stopping before a stop bar (line) on a road, for example, an alert is generated. A variable region is assigned to every vehicle or other ground transportation entity. The region is labeled as a dilemma zone in which the vehicle has not been yet labeled as a violating vehicle. If the vehicle crosses the dilemma zone into the danger zone because its speed or acceleration or both exceed predefined thresholds, the vehicle is labeled as a violating entity and an alert is generated. The thresholds for speed and acceleration are based on physics and kinematics and vary with each ground transportation entity that approaches the intersection, for example.

Two traditional rule-based approaches are 1) static TTI (Time-To-Intersection), and 2) static RDP (Required Deceleration Parameter). See Aoude, Georges S., et al. "Driver behavior classification at intersections and validation on large naturalistic data set." IEEE Transactions on Intelligent Transportation Systems 13.2 (2012): 724-736.

Static TTI (Time-To-Intersection) uses the estimated time to arrive at the intersection as the classification criteria. In its simplest form, TTI is computed as $$TTI = \frac{r}{v},$$

where r is distance to the crossing line at the intersection, and v is the current speed of the vehicle or other ground transportation entity. The vehicle is classified as dangerous if $TTI < TTI_{req}$, where $TTI_{req}$ is the time required for the vehicle to stop safely once braking is initiated. The $TTI_{req}$ parameter reflects the conservativeness level of the rule-based algorithm. The TTI is computed on the onset of braking, identified as when the vehicle deceleration crosses a deceleration threshold (e.g., −0.075 g). If a vehicle never crosses this threshold, the classification is performed at a specified last resort time, which typically ranges from 1 s to 2 s of estimated remaining time to arrive at the intersection.

Static RDP (Required Deceleration Parameter) calculates the required deceleration for the vehicle to stop safely given its current speed and position on the road. RDP is computed as $$RDP = \frac{v^2}{2 \times r \times g},$$

where r is distance to the crossing line at the intersection, and v is the current speed of the vehicle or other ground transportation entity. g is the gravity acceleration constant. A vehicle is classified as dangerous (that is, the vehicle has or will create a dangerous situation) if its required deceleration is larger than the chosen RDP threshold $RDP_{warn}$. In practice, a vehicle is classified as dangerous if at any time, $r < r_{alert}$, where $$r_{alert} = \frac{v^2}{2 \times RDP_{alert}}.$$

Similar to the static TTI algorithm, the $RDP_{alert}$ parameter reflects the conservativeness level of the rule-based algorithm.

We use rule-based approaches as a baseline for the assessment of the performance of our machine learning algorithms, and in some instances, we run them in parallel to the machine learning algorithms to capture the rare cases in which machine learning might not able to predict.

Machine Learning

Modeling driver's behaviors have been shown to be a complex task given the complexity of human behavior. See H. M. Mandalia and D. D. Dalvucci, \Using Support Vector Machines for Lane-Change Detection," Human Factors and Ergonomics Society Annual Meeting Proceedings, vol. 49, pp. 1965{1969, 2005. Machine learning techniques are well suited to model human behavior but need to "learn" using training data to work properly. To provide superior detection and prediction results, we use machine learning to model traffic detected at an intersection or other features of a ground transportation network during a training period before the alerting process is applied to current traffic during a deployment phase. Machine learning can be used also to model driver responses using in-vehicle data from onboard equipment (OBE), and could also be based on in-vehicle sensors and history of driving records and preferences. We also use machine learning models to detect and predict vulnerable road user (e.g., pedestrian) trajectories, behaviors and intents. Machine learning can be used also to model vulnerable road users responses from on-person equipment (OPE). These models could include interactions between entities, vulnerable road users, and between one or multiple entities and one or multiple vulnerable road users.

Machine learning techniques could be also used to model the behaviors of non-autonomous ground transport entities. By observing or communicating or both with a non-autonomous ground transportation entity, machine learning can be used to predict its intent and communicate with it and with other involved entities when a near-miss or accident or other dangerous situation is predicted.

The machine learning mechanism works in of two phases: 1) training and 2) deployment.

Training Phase

After installation, the RSE starts collecting data from the sensors to which it has access. Since AI model training requires intense computational capacity, it is usually performed on powerful servers that have multiple parallel processing modules to speed up the training phase. For this reason, the data acquired at the location of the RSE on the ground transportation network can be packaged and sent to a remote powerful server shortly after the acquisition. This is done using an Internet connection. The data is then prepared either automatically or with the help of a data scientist. The AI model is then built to capture important characteristics of the flow of traffic of vehicles and other ground transportation entities for that intersection or other aspects of the ground transportation network. Captured data features may include location, direction, and movement of the vehicles or other ground transportation entities, which can then be translated to intent and behavior. Knowing intent, we can predict actions and future behavior of vehicles or other ground transportation entities approaching the traffic location using the AI model, with high accuracy. The trained AI model is tested on a subset of the data that has not been included in the training phase. If the performance of the AI model meets expectations, the training is considered complete. This phase is repeated iteratively using different model parameters until a satisfactory performance of the model is achieved.

Deployment Phase

In some implementations, the complete tested AI model is then transferred through the Internet to the RSE at the traffic location in the ground transportation network. The RSE is then ready to process new sensor data and perform prediction and detection of dangerous situations such as traffic light violations. When a dangerous situation is predicted, the RSE will generate an appropriate alert message. The dangerous situation can be predicted, the alert message generated, and the alert message broadcast to and received by vehicles and other ground transportation entities in the vicinity of the RSE before the predicted dangerous situation occurs. This allows the operators of the vehicles or other ground transportation entities ample time to react and engage in collision avoidance. The outputs of the AI models from the various intersections at which the corresponding RSEs are located can be recorded and made available online in a dashboard that incorporates all the data generated and displayed in an intuitive and user-friendly manner. Such a dashboard could be used as an interface with the customer of the system (e.g., a city traffic engineer or planner). One example of dashboard is a map with markers that indicate the locations of the monitored intersections, violation events that have occurred, statistics and analytics based on the AI predictions and actual outcomes.

Smart RSE (SRSE) and the Connected Entity/Non-Connected Entity Bridge

As suggested earlier, there is a gap between the capabilities and actions of connected entities and non-connected entities. For example, connected entities are typically cooperative entities that continuously advertise to the world their location and safety system status such as speed, heading, brake status, and headlight status. Non-connected entities are not able to cooperate and communicate in these ways. Therefore, even a connected entity will be unaware of a non-connected entity that is not in the connected entity's vicinity or out of sensor range due to interference, distance, or the lack of a good vantage point.

With the proper equipment and configuration, RSEs can be made capable of detecting all entities using the ground transportation network in their vicinities, including non-connected entities. Specialized sensors may be used to detect different types of entities. For example, radars are suitable for detecting moving metallic objects such as cars, buses and trucks. Such road entities are most likely moving in a single direction towards the intersection. Cameras are suitable of detecting vulnerable road users who may wander around the intersection looking for a safe time to cross.

Placing sensors on components of the ground transportation network has at least the following advantages:

Good vantage point: Infrastructure poles, beams, and support cables usually have an elevated vantage point. The elevated vantage points allow for a more general view of the intersection. This is like an observation tower at an airport where controllers have a full view of most of the important and vulnerable users on the ground. For ground transportation entities, by contrast, the views from the vantage point of sensors (camera, lidar, radar, etc. . . . or others) can be obstructed or disrupted by a truck in a neighboring lane, direct sunlight, or other interference. The sensors at the intersection can be chosen to be immune or less susceptible to such interference. A radar, for example, is not affected by sunlight and will remain effective during the evening commute. A thermal camera will be more likely to detect a pedestrian in a bright light situation where the view of an optical camera becomes hindered.

Fixed location: Sensors situated at the intersection can be adjusted and fixed to sense in a specific direction that can be optimal for detecting important targets. This will help the processing software to better detect objects. As an example, if a camera has a fixed view, the background (non-moving objects and structures) information in the fixed view can be easily detected and used to improve the identification and classification of relatively important moving entities.

Fixed sensor location also enables easier placement of every entity in a unified global view of the intersection. Since the sensor view is fixed, the measurements from the sensor can be easily mapped to a unified global location map of the intersection. Such a unified map is useful when performing global analysis of traffic movements from all directions to study the interactions and dependencies of one traffic flow on another. An example would be in detecting a near miss (dangerous situation) before it happens. When two entities are traveling along intersecting paths, a global and unified view of the intersection will enable the calculation of the time of arrival of each entity to the point of intersection of the respective paths. If the time is within a certain limit or tolerance, a near miss may be flagged (e.g., made the subject of an alert message) before it happens.

With the help of the sensors that are installed on components of the infrastructure, smart RSEs (SRSEs) can bridge this gap and allow connected entities to be aware of "dark" or non-connected entities.

Figure 8:
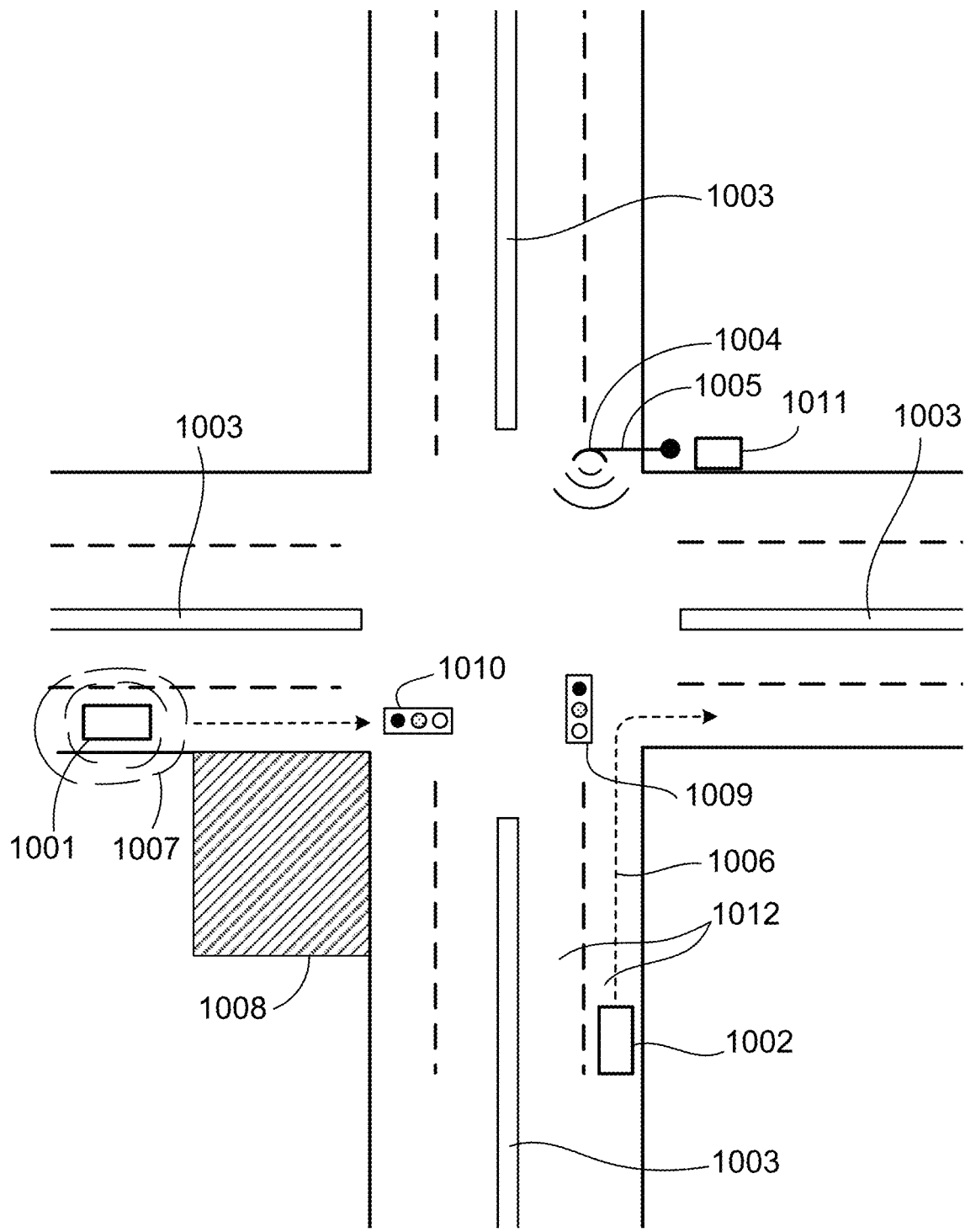

FIG. 8 depicts a scenario that explains how strategically placed sensors can help connected entities identify the speed and location of non-connected entities.

A connected entity 1001, is traveling along a path 1007. The entity 1001 has a green light 1010. A non-connected entity 1002 is traveling along a path 1006. It has a red light 1009 but will be making a right on red along path 1006. This will place it directly in the path of the entity 1001. A dangerous situation is imminent since the entity 1001 is unaware of the entity 1002. Because the entity 1002 is a non-connected entity it is unable to broadcast (e.g., advertise) its position and heading to other entities sharing the intersection. Moreover, the entity 1001, even though it is connected, is unable to "see" the entity 1002 which is obscured by the building 1008. There is a risk of the entity 1001 going straight through the intersection and hitting the entity 1002.

If the intersection is configured as a smart intersection, a radar 1004 mounted on a beam 1005 above the road at the intersection will detect the entity 1002 and its speed and distance. This information can be relayed to the connected entity 1001 through the SRSE 1011 serving as a bridge between the non-connected entity 1002 and the connected entity 1001.

Artificial Intelligence and Machine Learning

Smart RSEs also rely on learning traffic patterns and entity behaviors to better predict and prevent dangerous situations and avoid collisions. As shown in FIG. 8, the radar 1004 is always sensing and providing data for every entity moving along approach 1012. This data is collected and transferred to the cloud, either directly or through an RSE, for example, for analysis and for building and training a model that closely represents the traffic along approach 1012. When the model is complete, it is downloaded to the SRSE 1011. This model can then be applied to every entity moving along approach 1012. If an entity is classified by the model as one that is (or is going to) violate the traffic rules, a warning (alert) may be broadcast by the SRSE to all connected entities in the vicinity. This warning, known as intersection collision avoidance warning, will be received by the connected entities and can be acted upon to take account of the dangerous situation and avoid a collision. With the proper traffic model, a violating entity can be detected in advance, giving connected entities using the intersection enough time to react and avoid a dangerous situation.

With the help of multiple sensors (some mounted high on components of the infrastructure of the ground transportation network), artificial intelligence models, and accurate traffic models, an SRSE can have a virtual overview of the ground transportation network and be aware of every entity within its field of view including non-connected entities in the field of view that are not "visible" to connected entities in the field of view. The SRSE can use this data to feed the AI model and provide alerts to connected entities on behalf of non-connected entities. A connected entity would not otherwise know that there are non-connected entities sharing the road.

SRSEs have high power computing available at the location of the SRSE either within the same housing or by connection to a nearby unit or through the Internet to servers. An SRSE can process data received directly from sensors, or data received in broadcasts from nearby SRSEs, emergency and weather information, and other data. An SRSE is also equipped with high capacity storage to aid in storing and processing data. High bandwidth connectivity is also needed to help in transferring raw data and AI models between the SRSE and even more powerful remote servers. SRSEs enhance other traffic hazard detection techniques using AI to achieve high accuracy and provide additional time to react and avoid a collision.

SRSEs can remain compatible with current and new standardized communication protocols and, therefore, they can be seamlessly interfaced with equipment already deployed in the field.

SRSEs can also reduce network congestion by sending messages only when necessary.

Global and Unified Intersection Topology

Effective traffic monitoring and control of an intersection benefits from a bird's eye view of the intersection that is not hindered by obstacles, lighting, or any other interference.

As discussed above, different types of sensors can be used to detect different types of entities. The information from these sensors can be different, e.g., inconsistent with respect to the location or motion parameters that its data represents or the native format of the data or both. For example, radar data typically includes speed, distance, and maybe additional information such as the number of moving and stationary entities that are in the field of view of the radar. Camera data, by contrast, can represent an image of the field of view at any moment in time. Lidar data may provide the locations of points in 3D space that correspond to the points of reflection of the laser beam emitted from the lidar at a specific time and heading. In general, each sensor provides data in a native format that closely represents the physical quantities they measure.

To get a unified view (representation) of the intersection, fusion of data from different types of sensors is useful. For purposes of fusion, the data from various sensor is translated into a common (unified) format that is independent of the sensor used. The data included in the unified format from all of the sensors will include the global location, speed, and heading of every entity using the intersection independently of how it was detected.

Armed with this unified global data, a smart RSE can not only detect and predict the movement of entities, but also can determine the relative positions and headings of different entities with respect to each other. Therefore, the SRSE can achieve improved detection and prediction of dangerous situations.

Figure 9:
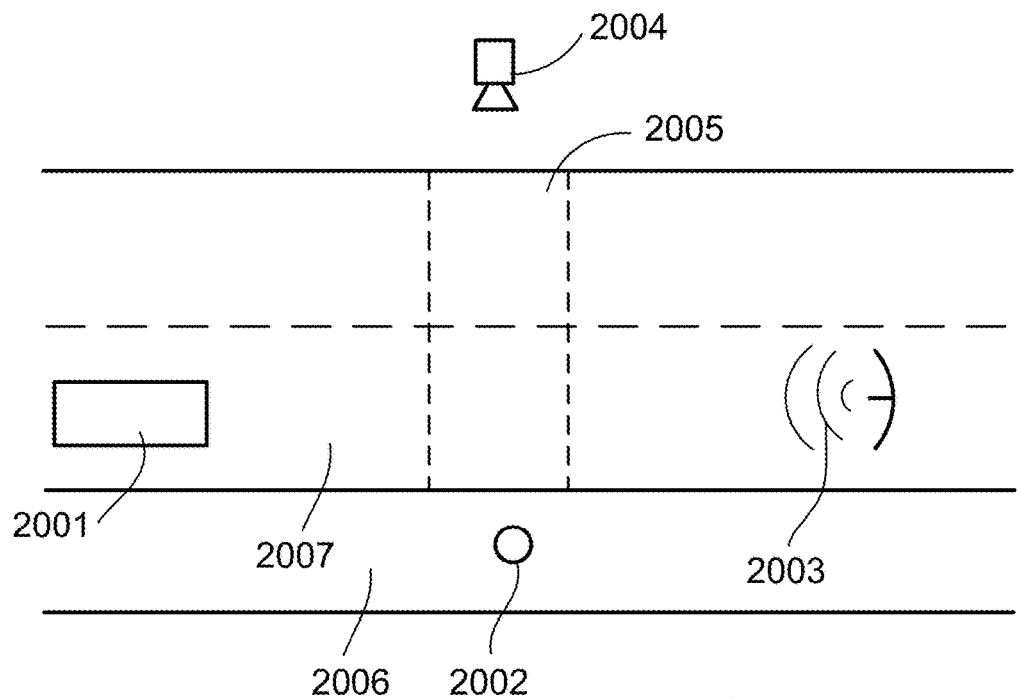

For example, in the scenario shown in FIG. 9, a motorized entity 2001 and a vulnerable road user 2002 share the same pedestrian crossing. The entity 2001 is traveling along a road 2007 and is detected by radar 2003. The vulnerable road user 2002 walking along sidewalk 2006 is detected by a camera 2004. The vulnerable road user 2002 may decide to cross the road 2007 using a crosswalk 2005. Doing so places the road user 2002 in the path of entity 2001 creating a possible dangerous situation. If the data from each of the sensors 2003 and 2004 were considered independently and no other information were considered, the dangerous situation would not be identified since each of the sensors can only detect the entities in its respective fields of view. Additionally, each of the sensors may not be able to detect objects that they are not designed to detect. However, when a unified view is considered by the SRSE, the locations and dynamics of the entity 2001 and of the vulnerable road user 2002 can be placed in the same reference frame: a geographic coordinate system such as a map projections or other coordinate system. When considered within a common reference system, the fused data from the sensors can be used to detect and predict a dangerous situation that may arise between the two entities 2001 and 2002. We will discuss the translation between the sensor space and the unified space in the following paragraphs.

Radar Data to Unified Reference Translation

Figure 10:
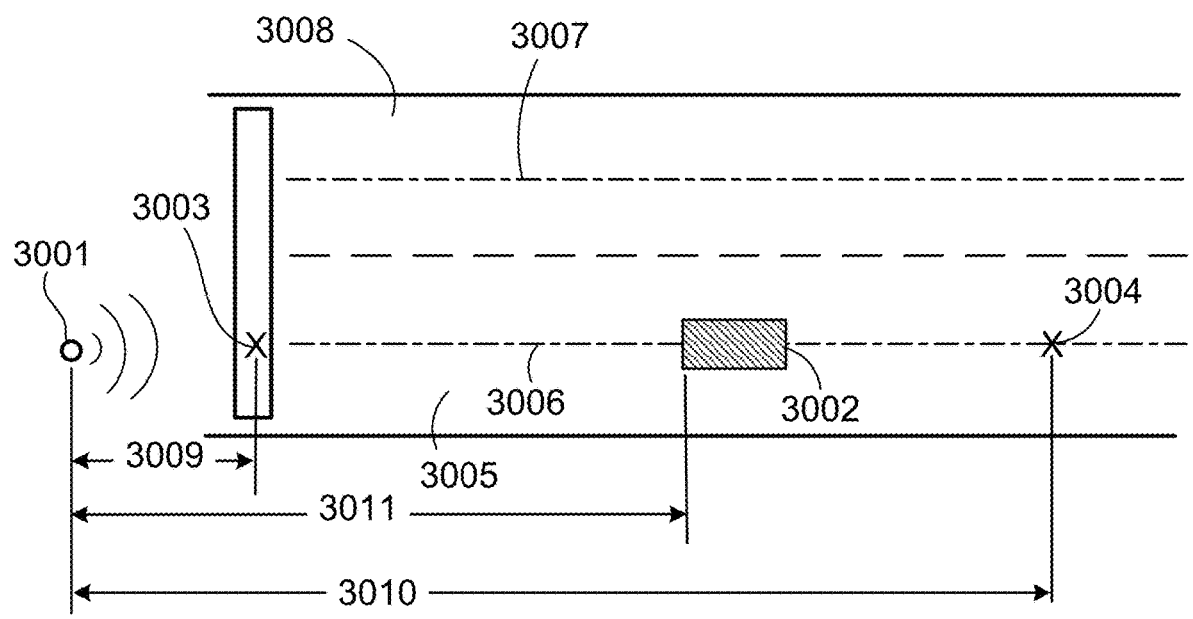

As shown in FIG. 10, a radar 3001 is used to monitor road entities traveling along a road having two lanes 3005 and 3008 with centerlines 3006 and 3007 respectively. A stop bar 3003 indicates the end of lanes 3005 and 3008. T 3006 can be defined by a set of markers 3003 and 3004. FIG. 10 shows only two markers but, in general, the centerline is a piecewise linear function. The global locations of markers 3003 and 3004 (and the other markers, not shown) are predefined by the design of the roadway and are known to the system. The precise global location of radar 3001 can also be determined. Distances 3009 and 3010 of markers 3003 and 3004 from the radar 3001 can, therefore, be calculated. The distance 3011 of the entity 3002 from the radar 3001 can be measured by the radar 3001. Using simple geometry, the system can determine the location of the entity 3002 using the measured distance 3011. The result is a global location since it is derived from the global locations of markers 3003, 3004 and the radar 3001. Since every roadway can be approximated by a generalized piecewise linear function, the method above can be applied to any roadway that can be monitored by a radar.

Figure 11:
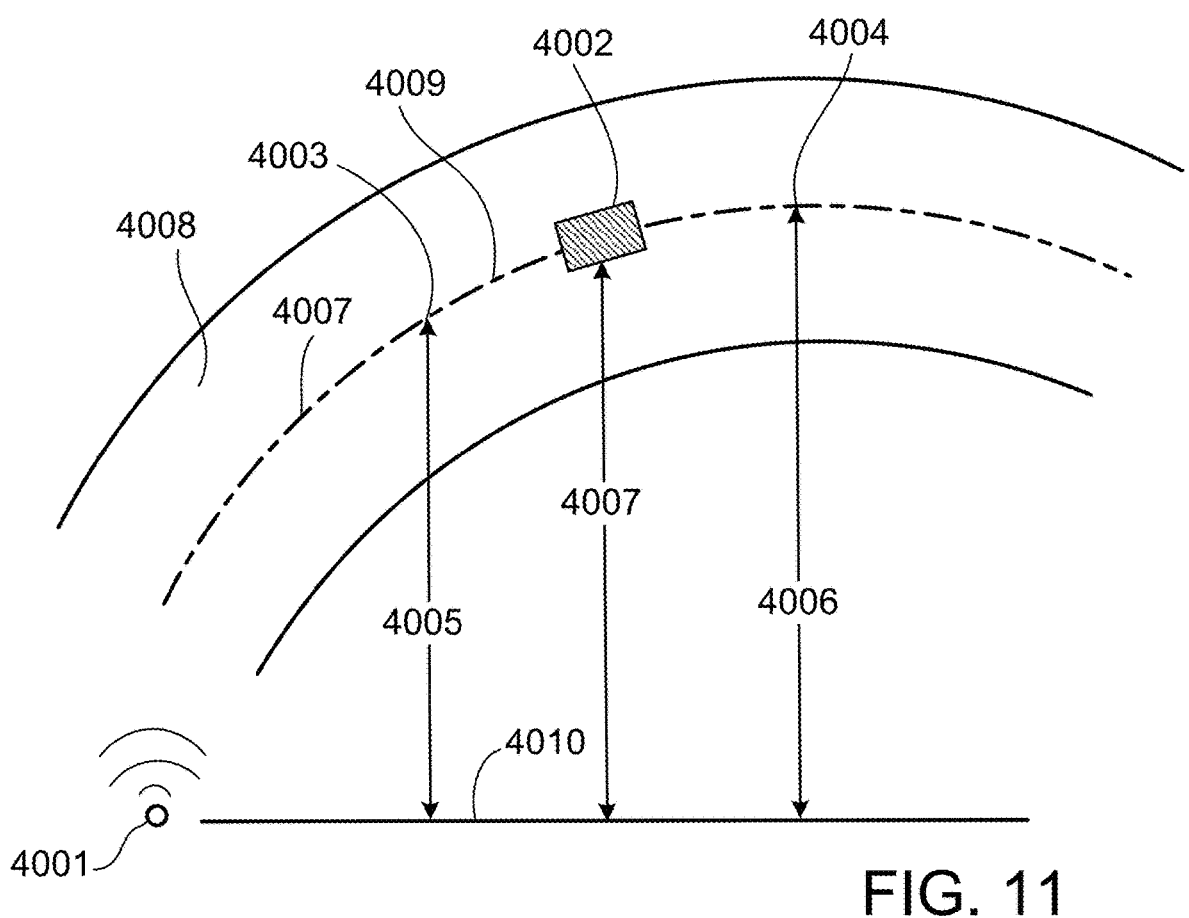

FIG. 11 shows a similar scenario on a curved road. Radar 4001 monitors entities moving along a road 4008. The markers 4003 and 4004 represent a linear segment 4009 (of the piecewise linear function) of the centerline 4007. The distances 4005 and 4006 represent the normal distance between the plane 4010 of the radar 4001 and the markers 4003 and 4004 respectively. Distance 4007 is the measured distance of entity 4002 from the radar plane 4010. Following the discussion above, given the global locations of the radar 4001 and the markers 4003 and 4004, the global location of the entity 4002 can be calculated using simple ratio arithmetic.

Camera Data to Unified Reference Translation

Knowing the height, global location, direction, tilt and field of view of a camera, calculating the global location of every pixel in the camera image become straight forward using existing 3D geometry rules and transformations. Consequently, when an object is identified in the image, its global location can be readily deduced by knowing the pixels it occupies. It is beneficial to note that the type of camera is irrelevant if its specifications are known, such as sensor size, focal length, or field of view, or combinations of them.

Figure 12:
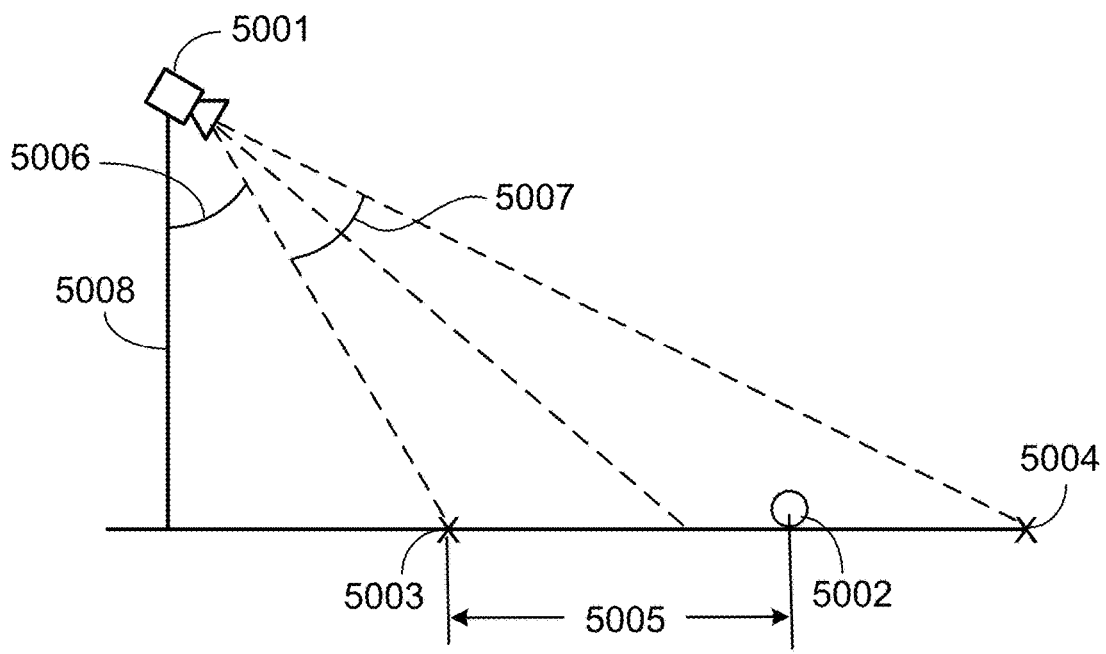
FIGS. 12 and 16 are schematic side and perspective views of road networks.

FIG. 12 shows a side view of a camera 5001 looking at an entity 5002. The height 5008 and tilt angle 5006 of the camera 5001 can be determined at the time of installation. The field of view 5007 can be obtained from the specifications of the camera 5001. The global location of the camera 5001 can also be determined at the time of installation. From the known information, the system can determine the global positions of the points 5003 and 5004. The distance between points 5003 and 5004 is also divided into pixels on the image created by the camera 5001. This number of pixels is known from the camera 5001 specifications. The pixels occupied by the entity 5002 can be determined. The distance 5005 can therefore be calculated. The global location of entity 5002 can also be calculated.

Figure 13:
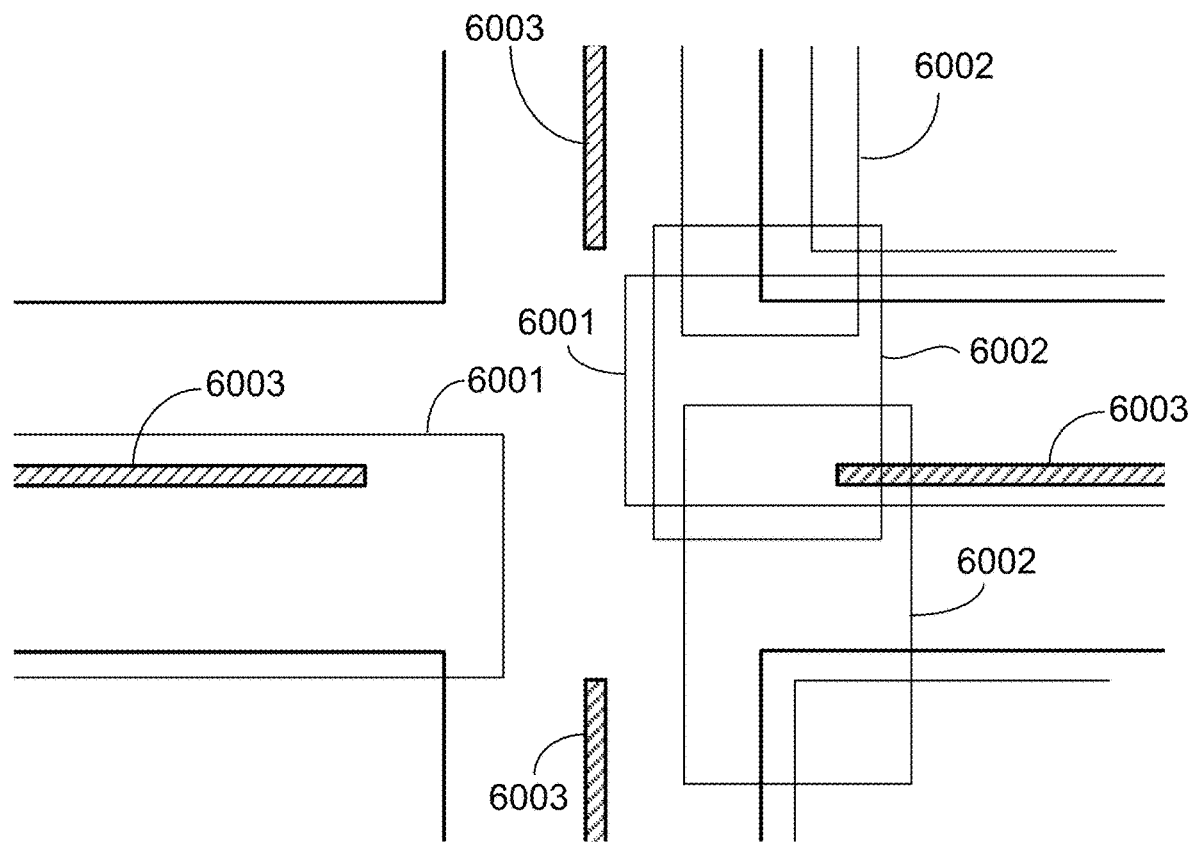

A global unified view of any intersection can be pieced together by fusing the information from various sensors. FIG. 13 depicts a top view of a four-way intersection. Every leg of the intersection is divided by a median 6003. The intersection in the figure is being monitored by two different types of sensors, radars and cameras, and the principles discussed here can be generalized to other types of sensors. In this example, radar monitored regions 6001 overlap camera monitored regions 6002. With a unified global view, every entity that travels between regions will remain tracked within the unified global view. This makes determinations by the SRSE, for example, of relationships between the motions of different entities easily possible. Such information will allow for a truly universal birds eye view of the intersection and roadways. The unified data from the sensors can then be fed into artificial intelligence programs as described in the following paragraphs.

FIG. 2, discussed above illustrated components of an RSE. In addition, in an SRSE, the processing unit may also include one or several specialized processing units that can process data in parallel. An example of such units are graphic processing units or GPUs. With the aid of GPUs or similar hardware, machine learning algorithms can run much more efficiently at the SRSE and will be able to provide results in real time. Such a processing architecture enables real time prediction of dangerous situations and therefore enables sending warnings early on to allow the entities enough time to react and avoid collisions. In addition, because an SRSE can run processes that can use the data from different sensors and different types of sensors, the SRSE can build a unified view of the intersection that would help in the analysis of traffic flows and the detection and prediction of dangerous situations.

Use Cases

A wide variety of cases can benefit from the system and the early warnings that it can provide for collision avoidance. Examples are provided here.

Case 1: Vulnerable Ground Transportation Entities

Figure 4:
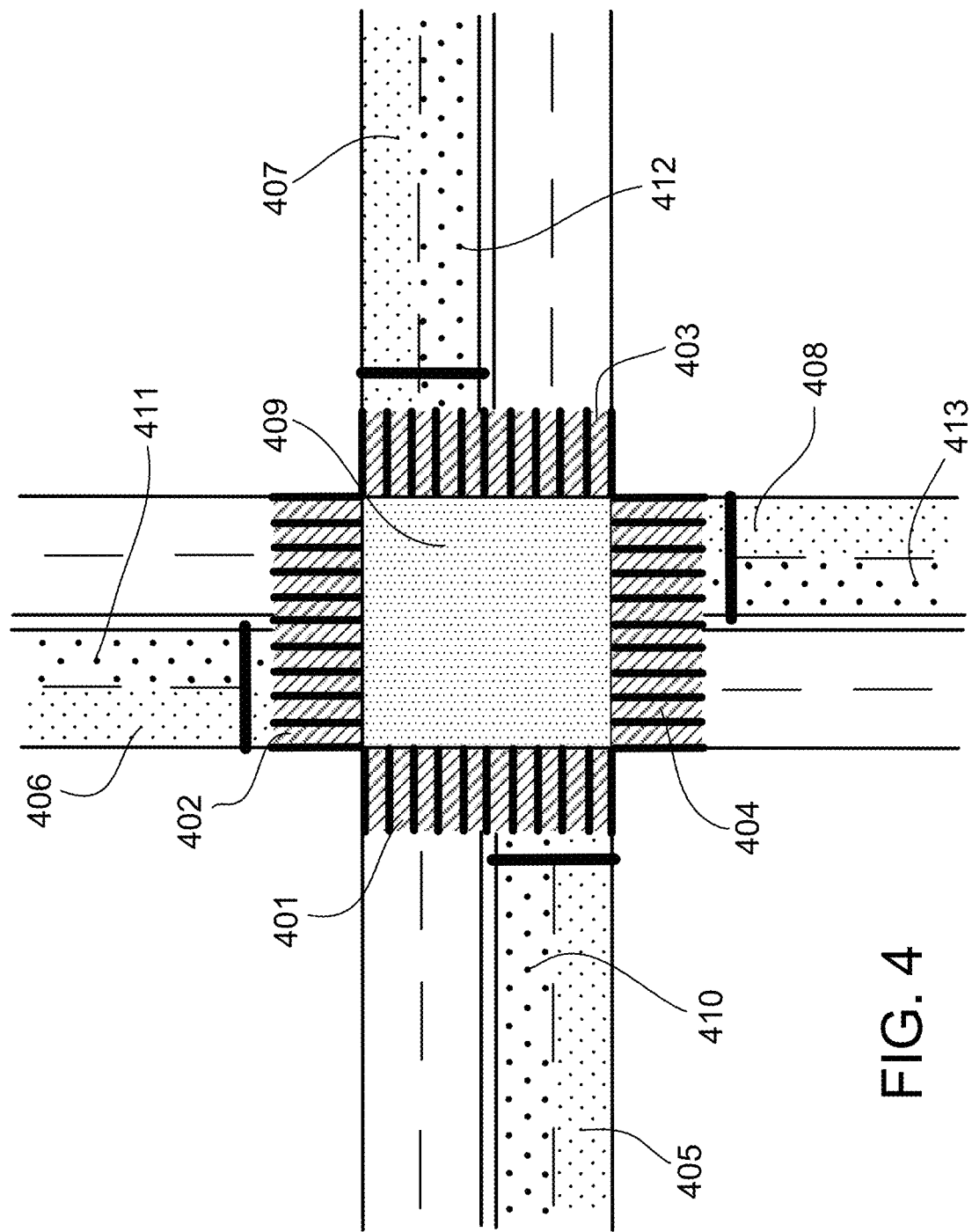

As shown in FIG. 4, a roadway that crosses a typical intersection 409 may have a pedestrian crosswalk including specific crossing areas 401, 402, 403, 404 that pedestrians and other vulnerable road users (vulnerable road users) may use to walk across the roadway. Sensors that are adequate to detect such crossings or other vulnerable users are placed at one or more vantage points that allow the monitoring of the crosswalk and its surroundings. During a training phase, the collected data can be used to train an artificial intelligence model to learn about the behavior of vulnerable road users at the intersection. During a deployment phase, the AI model then can use current data about a vulnerable road user to predict, for example, that the vulnerable road user is about to cross the roadway, and to make that prediction before the vulnerable road user begins to cross. When behavior and intent of pedestrians and other vulnerable road users, drivers, vehicles, and other people and ground transportation entities can be predicted in advance, early warnings (e.g., alerts) can be sent to any or all of them. Early warning can enable vehicles to stop, slow down, change paths, or combinations of them, and can enable vulnerable road users to refrain from crossing the road when a dangerous situation is predicted to be imminent.

In general, sensors are used to monitor all areas of possible movement of vulnerable road users and vehicles in the vicinity of an intersection. The types of sensors used depend on the types of subjects being monitored and tracked. Some sensors are better at tracking people and bicycles or other non-motorized vehicles. Some sensors are better at monitoring and tracking motorized vehicles. The solution described here is sensor and hardware agnostic, because the type of sensor is irrelevant if it provides appropriate data at a sufficient data rate which can be depend on the types of subjects being monitored and tracked. For example, Doppler radar would be an appropriate sensor to monitor and track the speed and distance of vehicles. The data rate, or sampling rate, is the rate at which the radar is able to provide successive new data values. The data rate must be fast enough to capture the dynamics of the motions of the subject being monitored and tracked. The higher the sampling rate, the more details are captured and the more robust and accurate the representation of the motion by the data becomes. If the sampling rate is too low, and the vehicle travels a significant distance between two sample instances, it becomes difficult to model the behavior because of the missed details during the intervals for which data is not generated.

For a pedestrian crossing, sensors will monitor the pedestrian and other vulnerable road users (e.g., cyclists) crossing at the intersection and the areas in the vicinity of the intersection. The data from these sensors may be segmented as representing conditions with respective different virtual zones to help in detection and localization. The zones can be chosen to correspond to respective critical areas where dangerous situations may be expected, such as sidewalks, entrances of walkways, and incoming approaches 405, 406, 407, 408 of the roads to the intersection. The activity and other conditions in every zone is recorded. Records can include, but are not limited to kinematics (e.g., location, heading, speed, and, acceleration) and facial and body features (e.g., eyes, posture)

The number of sensors, number of zones, and shapes of zones are specific to every intersection and to every approach to the intersection.

Figure 5:
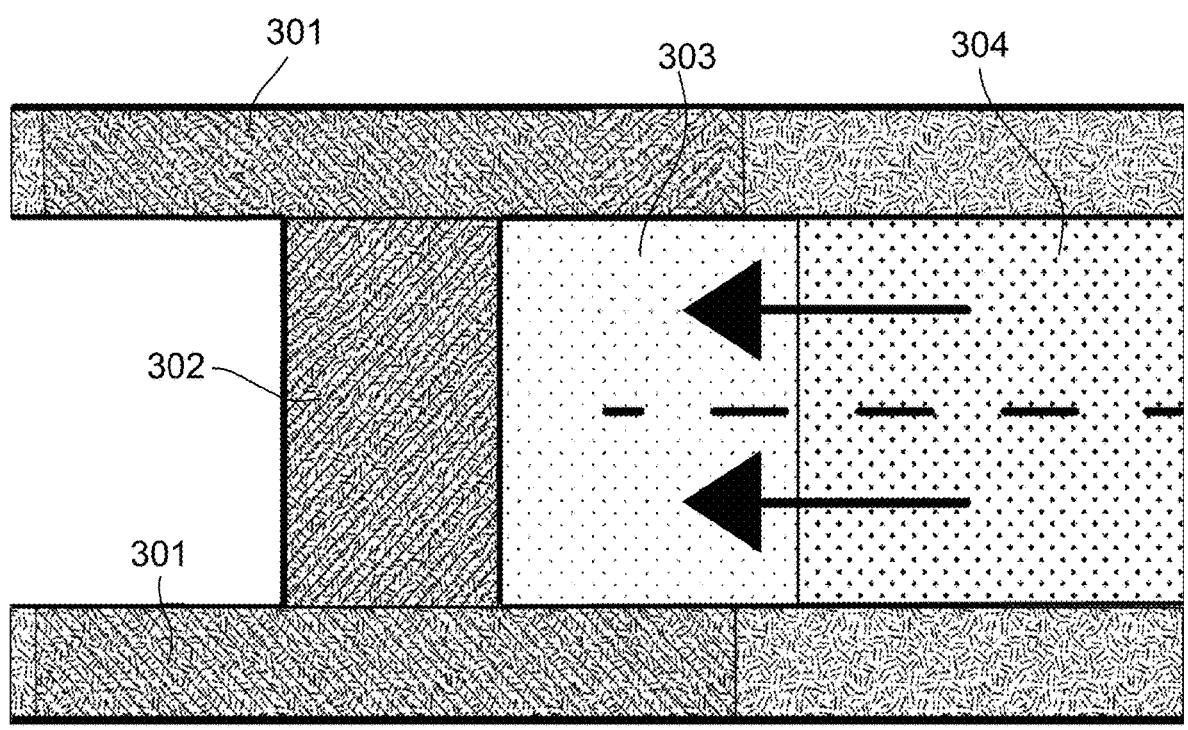

FIG. 5 depicts a plan view of a typical example setup showing different zones used to monitor and track the movement and behavior of pedestrians or other vulnerable road users, and motorized and non-motorized vehicles and other ground transportation entities.

Sensors are set up to monitor a pedestrian crosswalk across a road. Virtual zones (301, 302) may be placed on the sidewalks and along the crosswalk. Other sensors are placed to monitor vehicles and other ground transportation entities proceeding on the road leading to the crosswalk, and virtual zones (303, 304) are strategically placed to aid in detecting incoming vehicles and other ground transportation entities, their distances from the crosswalk, and their speeds, for example.

The system (e.g., the RSE or SRSE associated with the sensors) collects streams of data from all sensors. When the system is first put into operation, to help with equipment calibration and functionality, an initial rule-based model may be deployed. In the meantime, sensor data (e.g., speed and distance from radar units, images and video from cameras) is collected and stored locally at the RSE in preparation, in some implementations, to be transferred to a remote computer that is powerful enough to build an AI model of the behavior of the different entities of the intersection using this collected data. In some cases, the RSE is a SRSE capable of generating the AI model itself.

The data is then prepared, and trajectories are built for every ground transportation entity passing through the intersection. For example, trajectories can be extracted from radar data by stitching together points of different distances that belong to the same entity. Pedestrian trajectories and behavior can be, for example, extracted from camera and video recordings. By performing video and image processing techniques, the movement of the pedestrian can be detected in images and videos and their respective trajectories can be deduced.

For human behavior, an intelligent machine learning based model typically outperforms a simple rule based on simple physics. This is because human intent is difficult to capture, and large datasets are needed to be able to detect patterns.

When the machine learning (AI) model is completed at the server, it is downloaded to the RSE through the Internet, for example. The RSE then applies current data captured from the sensors to the AI model to cause it to predict intent and behavior, to determine when a dangerous situation is imminent, and to trigger corresponding alerts that are distributed (e.g., broadcast) to the vehicles and other ground transportation entities and to the vulnerable road users and drivers as early warnings in time to enable the vulnerable road users and drivers to undertake collision avoidance steps.

This example setup can be combined with any other use case, such as traffic at signalized intersections or level crossings.

Case 2: Signalized Intersection

In the case of a signalized intersection (e.g., one controlled by a traffic light) the overall setup of the system is done as in case 1. One difference may be the types of sensors used to monitor or track vehicle speed, heading, distance, and location. The setup for the pedestrian crossing of case 1 can also be combined with the signalized intersection setup for a more general solution.

The concept of operations for the signalized intersection use case is to track road users around the intersection using external sensors collecting data about the users or data communicated by the users themselves, predict their behaviors and broadcast alerts through different communication means about upcoming hazardous situations, generally due to violations of intersection traffic rules, such as violating a red-light signal.

Data on road users can be collected using (a) entity data broadcast by each entity itself about its current state, through a BSM or a PSM for instance; and (b) sensors installed externally on infrastructure or on vehicles, such as doppler radars, ultrasonic sensors, vision or thermal cameras, lidars, and others. As mentioned earlier, the type of sensor selected and its position and orientation at the intersection should provide the most comprehensive coverage of the intersection, or the part of it under study and that the data collected about the entities approaching the intersection is the most accurate. Thus, the data collected will allow reconstruction of the current states of road users and creation of an accurate, timely, useful VBSM (virtual basic safety message) or VPSM (virtual personal safety message). The frequency at which data should be collected depends on the potential hazard of each type of road user and the criticality of a potential violation. For instance, motorized vehicles traveling at high speeds in the intersection usually require data updates 10 times per second to achieve real time collision avoidance; pedestrians crossing the intersection at much lower speeds can require data updates as low as 1 time per second.

As noted earlier, FIG. 4 depicts an example of a signalized intersection plan view with detection virtual zones. These zones can segment every approach to the intersection into separate lanes 410, 411, 412, 413, 405, 406, 407, 408 and may also separate each lane into areas that correspond to general ranges of distance from the stop bar. The choice of these zones may be performed empirically to match the character of the specific approaches and intersection in general. Segmenting the intersection allows for more accurate determinations of relative heading, speed, acceleration, and positioning for each road user and in turn a better assessment of the potential hazard that road user presents to other ground transportation entities.

In order to determine whether an observed traffic situation is a dangerous situation, the system also needs to compare the outcome of the predicted situation with the traffic light state and account for local traffic rules (e.g. left-turn lanes, right-turn on red, and others). Therefore, it is necessary to collect and use the intersection's signal phase and timing (SPaT) information. SPaT data can be collected by interfacing directly with the traffic light controller at the intersection, generally through a wired connection reading the data, or by interfacing with the traffic management system to receive the required data, for instance through an API. It is important to collect SPaT data at a rate as close as possible to the rate at which road user data is collected to ensure that road user state is always synchronized with traffic signal state. An added complexity to the requirement of knowing SPaT information is that modern traffic control strategies employed to regulate traffic flow around intersections are not based on fixed timings and use algorithms that can dynamically adapt to real-time traffic conditions. It is thus important to incorporate SPaT data prediction algorithms to insure the highest accuracy in violation prediction. These SPaT data prediction algorithms can be developed using rule-based methods or machine learning methods.

For each approach to the intersection, data is collected by the RSE (or SRSE) and a machine learning (AI) model is constructed to describe the behavior of the vehicles corresponding to the collected data. Current data collected at the intersection is then applied to the AI model to produce an early prediction whether a vehicle or other ground transportation entity traveling on one of the approaches to the intersection is, for example, about to violate the traffic light. If a violation is imminent, a message is relayed (e.g., broadcast) from the RSE to ground transportation entities in the vicinity. Vehicles (including the violating vehicle) and pedestrians or other vulnerable road users will receive the message and have time to take appropriate pre-emptive measures to avoid a collision. The message can be delivered to the ground transportation entities in one or more of the following ways, among others: a blinking light, sign, or radio signal.

If a vehicle or other entity approaching the intersection is equipped with an OBE or an OPE, it will be able to receive the message broadcast from the RSE that a potential hazard has been predicted at the intersection. This allows the user to be warned and to take appropriate pre-emptive measures to avoid a collision. If the violating road user at the intersection is also equipped with an OBE or an OPE, the user will also receive the broadcast alert. Algorithms on the OBE or an OPE can then reconcile the message with the violating behavior of the user and warn the user adequately.

The decision to send an alert is dependent not only on the vehicle behavior represented by the data collected by the sensors at the intersection. Although the sensors play a major role in the decision, other inputs are also considered. These inputs may include, but not be limited to, information from a nearby intersection (if a vehicle ran the light at a nearby intersection, there is higher probability that it would do the same at this intersection), information from other cooperative vehicles, or even the vehicle itself, if for example it is reporting that it has a malfunction.

Case 3: Non-Signalized Intersection

Non-signalized controlled intersections, such as a stop sign or yield sign-controlled intersection, can be monitored as well. Sensors are used to monitor the approach controlled by the traffic sign and predictions can be made about incoming vehicles, similar to predictions about incoming vehicles on an approach to a signalized controlled intersection. The rules of the roads at non-signalized controlled intersections are typically well defined. The ground transportation entity on an approach controlled by a stop sign must come to a full stop. In a multi-way stop intersection, the right-of-way is determined by the order the ground transportation entities reach the intersection. A special case can be considered with a one-way stop. A set of sensors can monitor the approach that does not have a stop sign as well. Such a setup can assist in stop sign gap negotiations. For a yield sign controlled intersection, a ground transportation entity on an approach controlled by a yield sign must reduce its speed to give right-of-way to other ground transportation entities in the intersection.

A main challenge is that due to internal (e.g., driver distraction) or external (e.g., lack of visibility) factors, ground transportation entities violate the rules of the road, and put other ground transportation entities at risk.

In the general case of stop-sign controlled intersections (i.e., each approach is controlled by a stop sign), the overall setup of the system is done as in case 1. One difference may be the types of sensors used to monitor or track vehicle speed, heading, distance, and location. Another difference is the lack of traffic light controllers with the rules of the roads being indicated by the road signs. The setup for the pedestrian crossing of case 1 can also be combined with the non-signalized controlled intersection setup for a more general solution.

FIG. 4 could also be understood to depict an example of a four-way stop intersection plan view with detection virtual zones. These zones can segment every approach to the intersection into separate lanes 410, 411, 412, 413, 405, 406, 407, 408 and may also separate each lane into areas that correspond to general ranges of distance from the stop bar. The choice of these zones may be made empirically to match the character of the specific approaches and the intersection in general.

In a manner similar to the one described above for FIG. 4, current data collected at the intersection is applied to the AI model to produce an early prediction whether a vehicle or other ground transportation entity traveling on one of the approaches to the intersection is about to violate the stop sign. If a violation is imminent, messages can be handled similarly to the previously described case involving a traffic light violation.

Also similarly to the previous description, the decision to send an alert can be based on factors described previously and on other information such as whether the vehicle ran the stop sign at a nearby intersection, suggesting a higher probability that it would do the same at this intersection).

Figure 18:
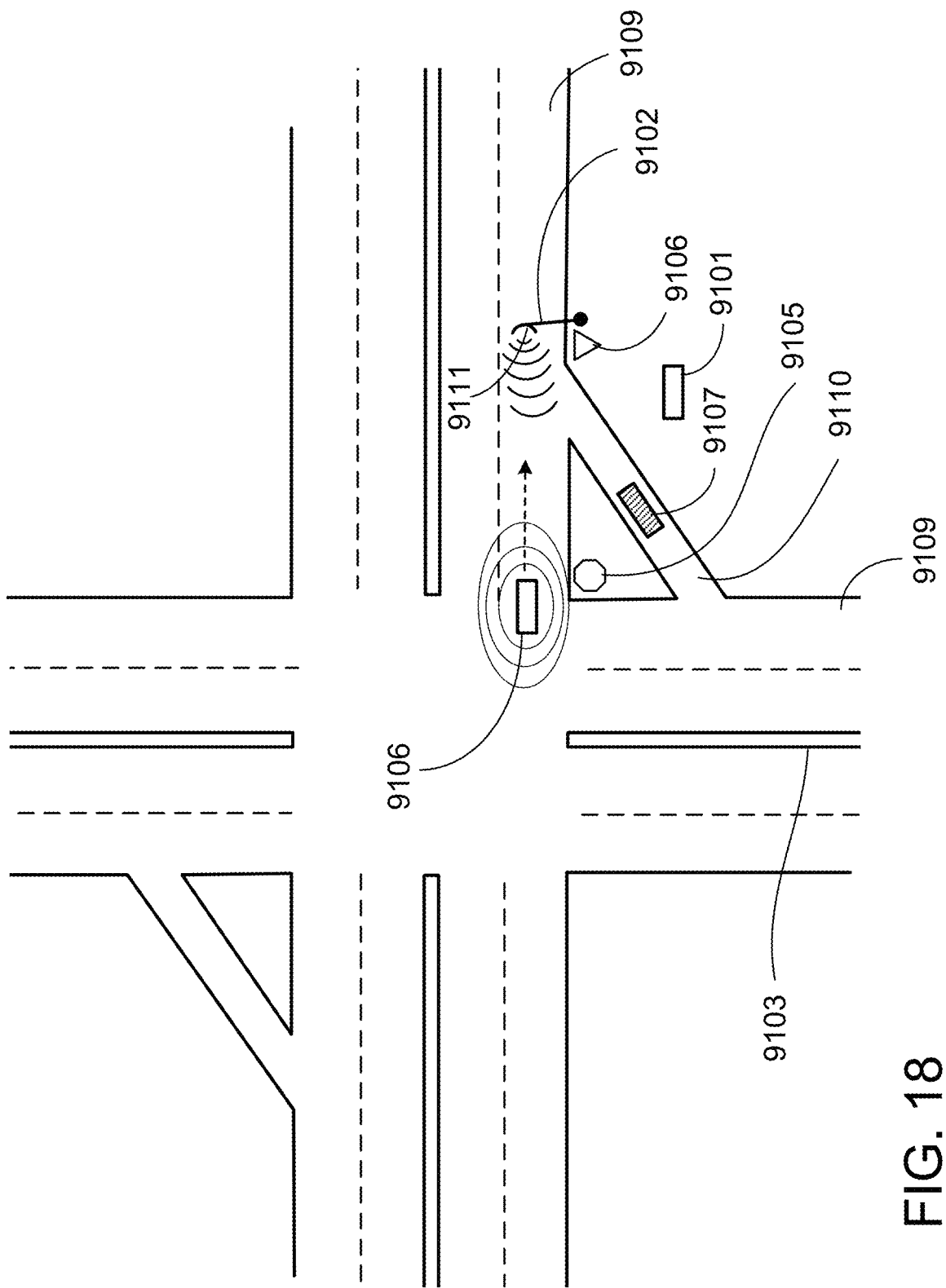

FIG. 18 illustrates a use case for controlled non-signalized intersection. It explains how the SRSE with strategically placed sensors can warn a connected entity of an impending dangerous situation arising from a non-connected entity.

A connected entity 9106, is traveling along a path 9109. The entity 9106 has the right of way. A non-connected entity 9107 is traveling along path 9110. The entity 9107 has a yield sign 9104 and will be merging onto the path 9109 without giving right of way to the entity 9106 placing it directly in the path of the entity 9106. A dangerous situation is imminent since the entity 9106 is unaware of the entity 9107. Because the entity 9107 is a non-connected entity, it is unable to advertise (broadcast) its position and heading to other entities sharing the intersection. Moreover, the entity 9106 may not be able to "see" the entity 9107 which is not in its direct field of view. If the entity 9106 proceeds along its path it may eventually have a collision with the entity 9107.

Because the intersection is a smart intersection, a radar 9111 mounted on a beam 9102 above the road will detect the entity 9107. It will also detect the entity 9107 speed and distance. This information can be relayed as an alert to the connected entity 9106 through the SRSE 9101. The SRSE 9101 has a machine learning model for entities moving along the approach 9110. The entity 9107 will be classified by the model as a potential violator of the traffic rule, and a warning (alert) will be broadcast to the connected entity 9106. This warning is sent in advance giving the entity 9106 enough time to react and prevent a dangerous situation.

Case 4: Level Crossings

Level crossings are dangerous because they may carry motorized vehicles, pedestrians, and rail vehicles. In many cases, the road leading to the level crossing falls in the blind spot of an operator (e.g., conductor) of a train or other rail vehicle. Since rail vehicle drivers operate mainly on line-of-sight information, this increases the possibility of an accident if the road user violates the rail vehicle's right of way and crosses a level crossing when it is not permitted to cross.

The operation of the level crossings use case is similar to the signalized intersection use case, in the sense that a level crossing is a conflict point between road and rail traffic often regulated by traffic rules and signals. Therefore, this use case also requires collision avoidance warnings to increase safety around level crossings. Rail traffic can have a systematic segregated right of way, e.g., high-speed rail, or no segregated right of way, e.g., light urban rail or streetcars. With light rail and streetcars, the use case becomes even more important since these rail vehicles also operate on live roads and have to follow the same traffic rules as road users.

Figure 6:
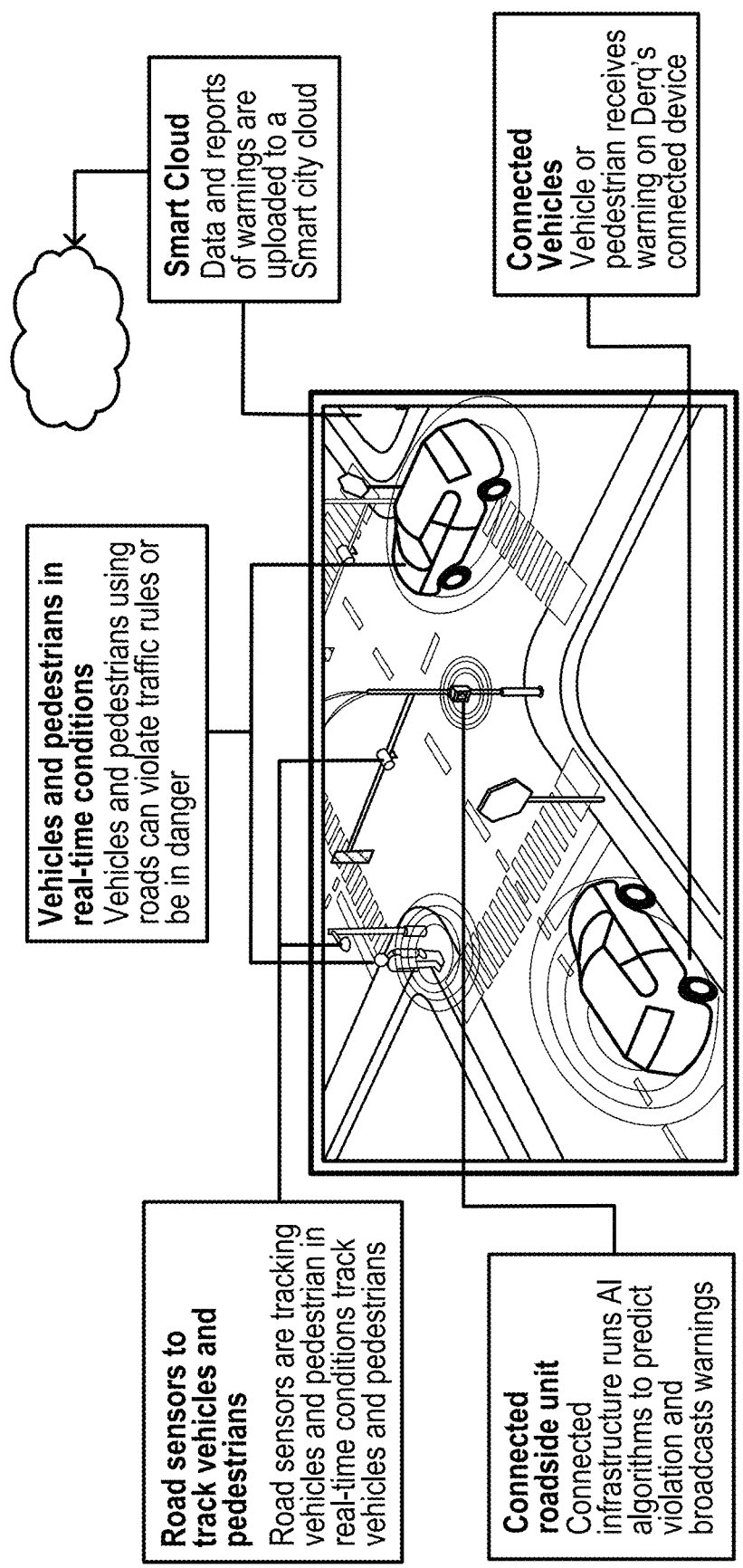
FIGS. 6 and 7 are annotated perspective views of intersections.
Figure 7:
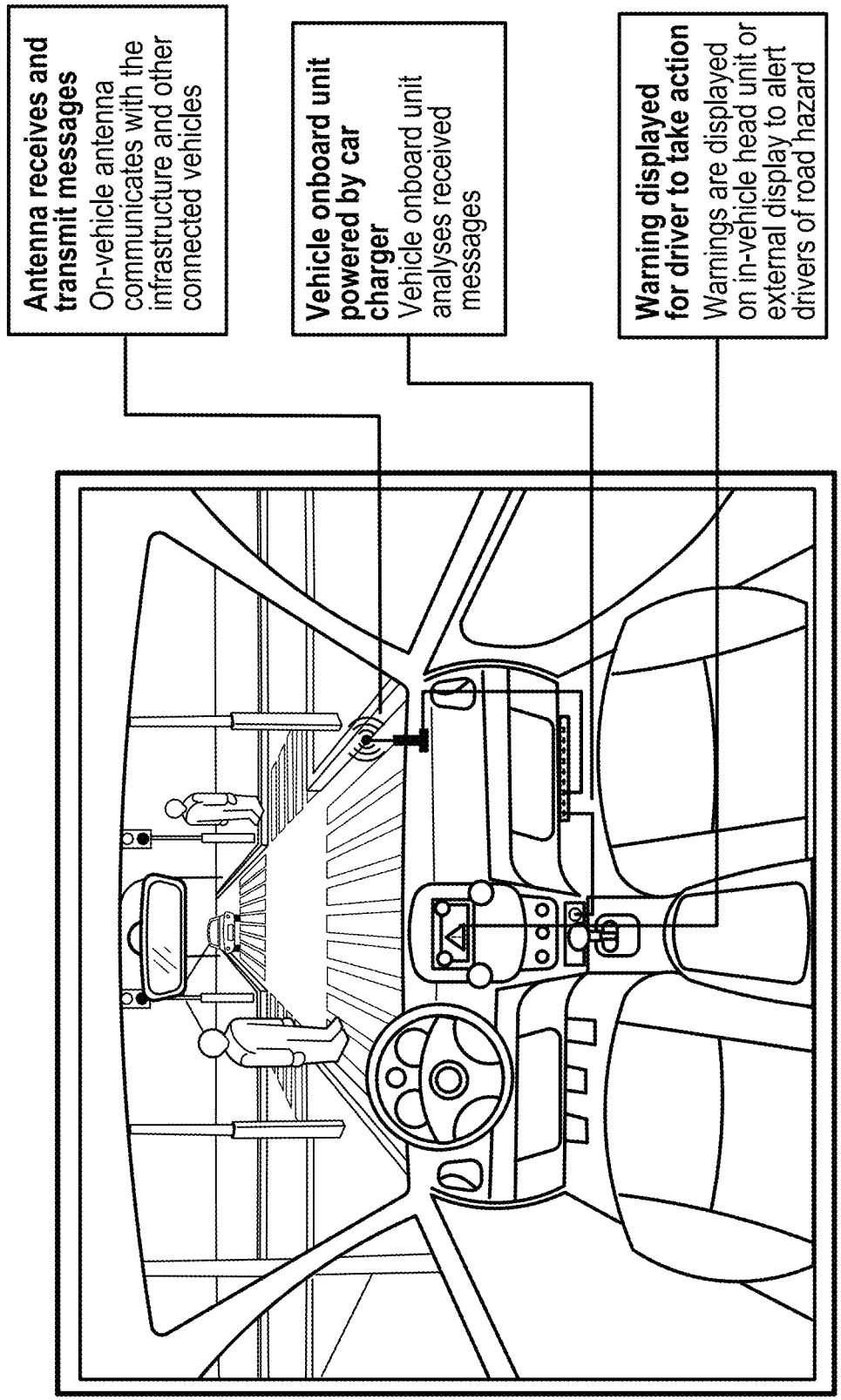

FIG. 6 depicts a general use of a level crossing where a road and a pedestrian crossing cross a railroad. Similar to the pedestrian crossing use case, sensors are placed to collect data on the movement and intent of pedestrians. Other sensors are used to monitor and predict movement of road vehicles that are set to approach the crossing. Data on road users can also be collected from road user broadcasts (e.g., BSMs or PSMs). Data from nearby intersections, vehicles, and remote command and control centers may be used in the decision to trigger an alert.

Data on SPaT for road and rail approaches will also need to be collected in order to adequately assess the potential for a violation.

Similarly to the signalized intersection use case, the data collected enables the creation of predictive models using rule-based and machine learning algorithms.

In this use case, the rail vehicle is equipped with an OBE or an OPE in order to receive collision avoidance warnings. When a violation of the rail vehicle's right of way is predicted, the RSE will broadcast an alert message, warning the rail vehicle driver that a road user is in its intended path and allowing the rail vehicle driver to take pre-emptive actions with enough time to avoid the collision.

If the violating road user is also equipped with an OBE or an OPE, the message broadcast by the RSE will also be received by the violating road user. Algorithms on the OBE or an OPE can then reconcile the received message with the violating behavior of the user and warn the user adequately.

Virtual Connected Ground Transportation Environment (Bridging the Gap)

As discussed above, a useful application of the system is to create a virtual connected environment on behalf of non-connected ground transportation entities. An impediment to the adoption of connected technology is not only the absence of infrastructure installations, but also the almost non-existence of connected vehicles, connected vulnerable road users, and connected other ground transportation entities.

With respect to connected vehicles, in some regulatory regimes, such vehicles are always sending what are called basic safety messages (BSMs). BSMs contain, among other information, the location, heading, speed, and future path of the vehicle. Other connected vehicles can tune in to these messages and use them to create a map of vehicles present in their surroundings. Knowing where the surrounding vehicles are, a vehicle, whether it is autonomous or not, will have information useful to maintain a high level of safety. For example, an autonomous vehicle can avoid making a maneuver if there is a connected vehicle in its path. Similarly, a driver can be alerted if there is some other vehicle in the path that he is planning to follow such as a sudden lane change.

Until all ground transportation entities are equipped to send and receive traffic safety messages and information, some road entities will be "dark" or invisible to the rest of the road entities. Dark road entities pose a risk of a dangerous situation.

Dark road entities do not advertise (e.g., broadcast) their location, so they are invisible to connected entities that may expect all road entities to broadcast their information (that is, to be connected entities). Although onboard sensors can detect obstacles and other road entities, the ranges of these sensors tend to be too short to be effective in preventing dangerous situations and collisions. Therefore, there is a gap between the connectivity of connected vehicles and the lack of connectivity of non-connected vehicles. The technology described below is aimed to bridge this gap by using intelligence on the infrastructure that can detect all vehicles at the intersection or other component of the ground transportation network and send messages on behalf of non-connected vehicles.

The system can establish a virtual connected ground transportation environment, for example, at an intersection, that can bridge the gap between the future when most vehicles (and other ground transportation entities) are expected to be connected entities and the current time when most vehicles and other ground transportation entities have no connectivity. In the virtual connected ground transportation environment, smart traffic lights and other infrastructure installations can use sensors to track all vehicles and other ground transportation entities (connected, non-connected, semi-autonomous, autonomous, non-autonomous) and (in the case of vehicles) generate virtual BSM messages (VBSM) on their behalf.

A VBSM message can be considered a subset of a BSM. It may not contain all the fields required to create a BSM but can contain all the localization information including location, heading, speed and trajectory. Since V2X communication is standardized and anonymized, VBSM and BSM cannot be differentiated easily and follow the same message structure. The main difference between the two messages is the availability of the sources of the information populating these messages. A VBSM might lack data and information not easily generated by external sensors such as steering wheel angle, brake status, tire pressure or wiper activation.

With the proper sensors installed, an intersection with smart RSE can detect all the road entities that are travelling through the intersection. The SRSE can also transform all data from multiple sensors into a global unified coordinate system. This global unified system is represented by the geographical location, speed and heading of every road entity. Every road entity, whether it is connected or not, is detected by the intersection equipment and a global unified location is generated on its behalf. Standard safety messages can, therefore, be broadcast on behalf of the road entities.

Figure 15:
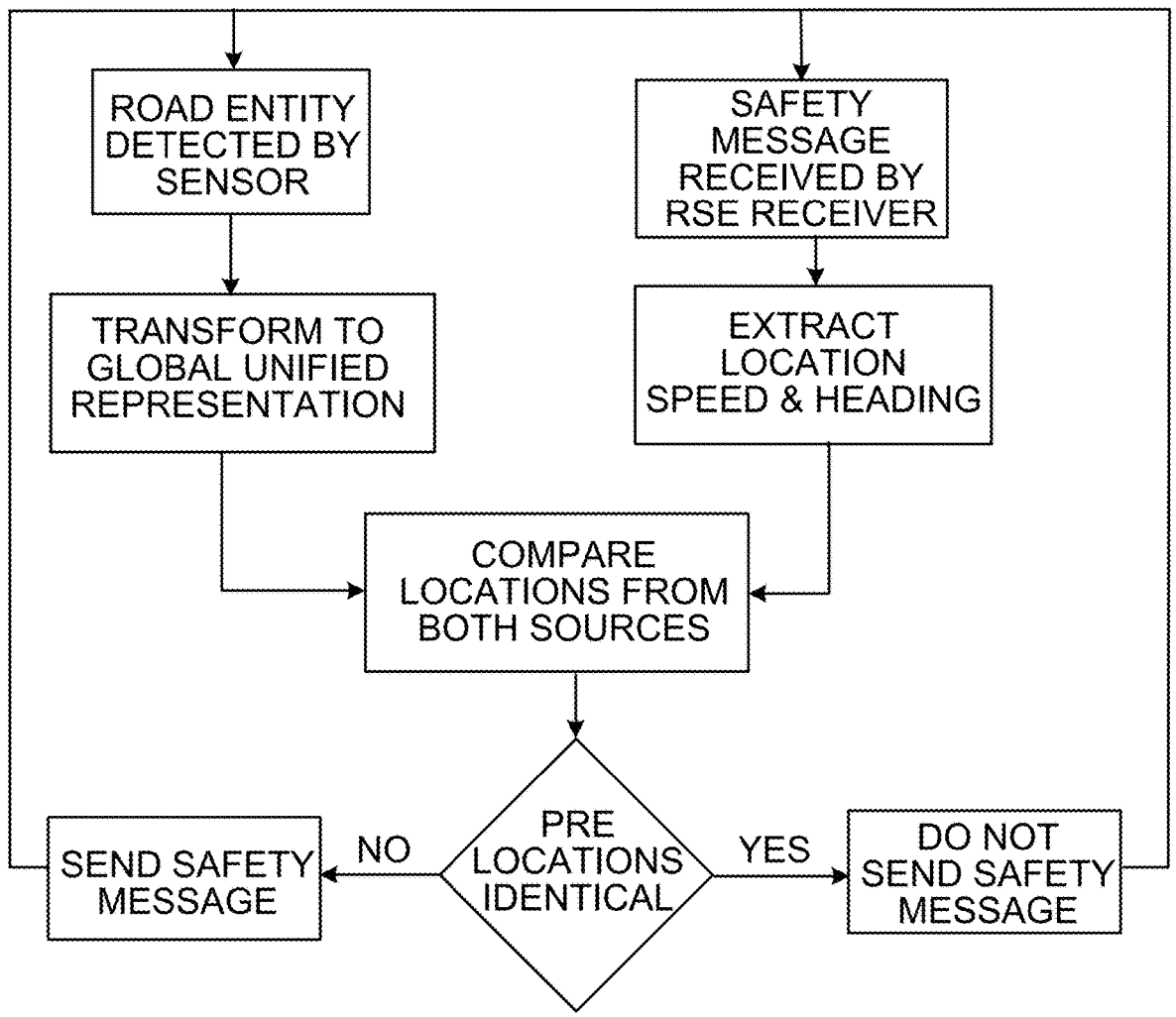

However, if the RSE broadcasts a safety message for all entities it detects, it may send a message on behalf of a connected road entity. To address the conflict, the RSE can filter the connected road entities from its list of dark entities. This can be achieved because the RSE is continuously receiving safety messages from connected vehicles, and the RSE sensors are continuously detecting road entities passing through the intersection. If the location of a detected road entity matches a location that from which a safety message is received by the RSE receiver, the road entity is assumed to be a connected and no safety message is broadcast on its behalf by the RSE. This is depicted in FIG. 15.

By creating the bridge between connected and non-connected vehicles, connected entities (including autonomous vehicles) can safely maneuver through intersections with complete awareness of all the road entities nearby.

Figure 17:
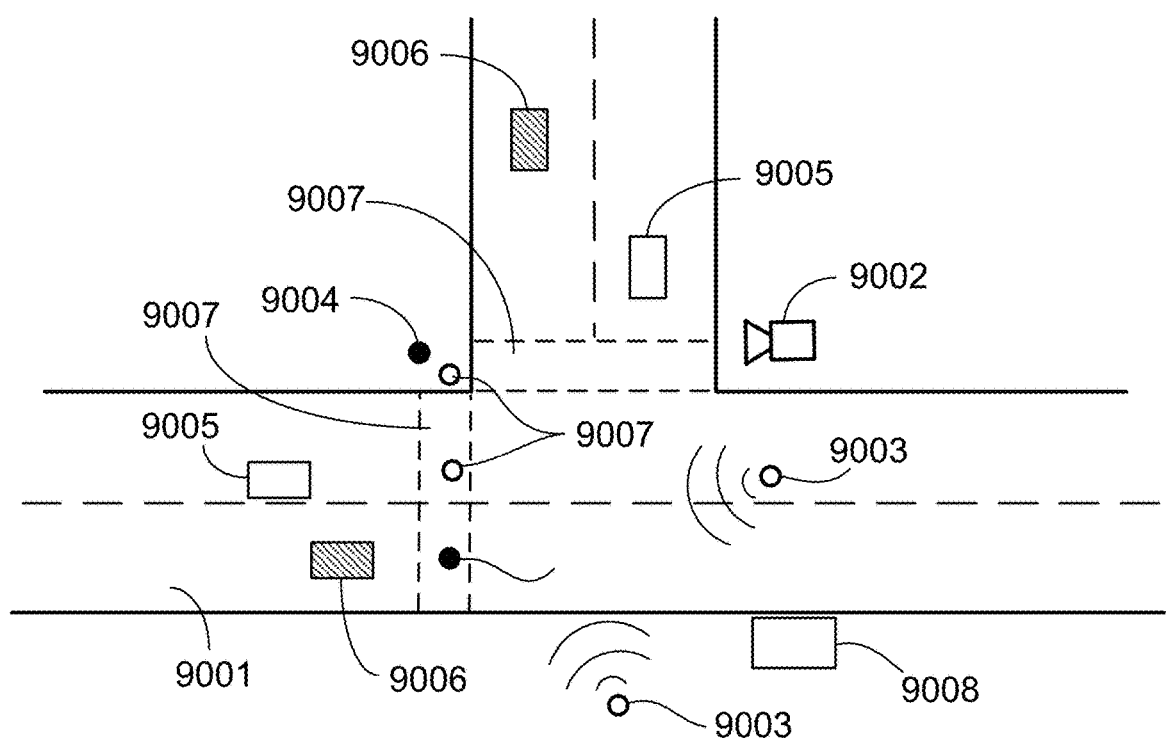

This aspect of the technology is illustrated in FIG. 17. An intersection 9001 has multiple road entities at a given time. Some of these entities are non-connected 9004, 9006 and others are connected 9005, 9007. Vulnerable road users 9004, 9007 are detected by a camera 9002. Motorized road entities 9005, 9006 are detected by radars 9003. The location of each road entity is calculated. Broadcasts from connected road entities are also received by the RSE 9008. The locations of entities from which messages are received are compared with the locations at which entities are detected. If two entities match within a predetermined tolerance, the entity at that location is considered connected and no safety message is sent on its behalf. The rest of the road entities that have no matching received location are considered dark. Safety messages are broadcast on their behalf.

For collision warnings and intersection violation warnings that are an integral part of V2X protocols, every entity needs to be connected for the system to be effective. That requirement is a hurdle in the deployment of V2X devices and systems. Intersections equipped with smart RSE will address that concern by providing a virtual bridge between connected and non-connected vehicles.

The US DOT (Department of Transportation) and NHTSA (National Highway Traffic Safety Administration) identify a number of connected vehicle applications that will use BSMs and help substantially decrease non-impaired crashes and fatalities. These applications include, but are not limited to, Forward Collision Warning (FCW), Intersection Movement Assist (IMA), Left Turn Assist (LTA), Do Not Pass Warning (DNPW), and Blind Spot/Lane Change Warning (BS/LCW). The US DOT and NHTSA define these applications as follows.

An FCW addresses rear-end crashes and warns drivers of stopped, slowing, or slower vehicles ahead. An IMA is designed to avoid intersection crossing crashes and warns drivers of vehicles approaching from a lateral direction at an intersection covering two major scenarios: Turn-into path into same direction or opposite direction and straight crossing paths. An LTA addresses crashes where one involved vehicle was making a left turn at the intersection and the other vehicle was traveling straight from the opposite direction and warns drivers to the presence of oncoming, opposite-direction traffic when attempting a left turn. A DNPW assists drivers to avoid opposite-direction crashes that result from passing maneuvers and warns a driver of an oncoming, opposite-direction vehicle when attempting to pass a slower vehicle on an undivided two-lane roadway. A BS/LCW addresses crashes where a vehicle made a lane changing/merging maneuver prior to the crashes and alerts drivers to the presence of vehicles approaching or in their blind spot in the adjacent lane.

V2X protocols stipulate that these applications should be achieved using vehicle-to-vehicle (V2V) communications, where one connected remote vehicle would broadcast basic safety messages to a connected host vehicle. The host vehicle's OBE would in turn try to reconcile these BSMs with its own vehicle parameters, such as speed, heading and trajectory and determine if there is a potential danger or threat presented by the remote vehicle as described in the applications above. Also, an autonomous vehicle will benefit specifically from such an application, since it allows surrounding vehicles to communicate intent, which is a key piece of information not contained in the data collected from its onboard sensors.

However, today's vehicles are not connected and, as mentioned earlier, it will take a significant period until the proportion of connected vehicles is high for BSMs to work as explained above. Therefore, in an environment in which the proportion of connected vehicles is small, the connected vehicles are not required to receive and analyze the large number of BSMs they would otherwise receive in an environment having a proportion of connected vehicles large enough to enable the applications described above and benefit fully from V2X communication.

VBSMs can help bridge the gap between the current environment having largely unconnected entities and a future environment having largely connected entities and enable the applications described above, during the interim. In the technology that we describe here, a connected vehicle receiving a VBSM will process it as a regular BSM in the applications. Since VBSMs and BSMs follow the same message structure and VBSMs contain substantially the same basic information as a BSM, e.g., speed, acceleration, heading, past and predicted trajectory, the outcome of applying the messages to a given application will be substantially the same.

For example, consider an intersection with non-protected left turns, where the connected host vehicle is about to attempt a left turn at a moment when and unconnected remote vehicle is traveling straight from the opposing direction with right of way. This is a situation where completion of the maneuver depends on the host vehicle driver's judgment of the situation. A wrong assessment of the situation may result in a conflict and a potential near-collision or collision. External sensors installed on the surrounding infrastructure can detect and track the remote vehicle or even both vehicles, collect basic information such as speed, acceleration, heading and past trajectory and transmit them to the RSE, which can in turn build the predicted trajectory for the remote vehicle using rule-based or machine learning algorithms or both, populate the required fields for the VBSM and broadcast it on behalf of the unconnected remote vehicle. The host vehicle's OBE will receive the VBSM with information about the remote vehicle and process it in its LTA application to determine whether the driver's maneuver presents a potential danger and if the OBE should display a warning to the host vehicle's driver to take preemptive or corrective action to avoid a collision. A similar result can also be achieved if the remote vehicle were connected and received data from the RSE and the sensors that an opposing vehicle was attempting a left turn with a predicted collision.

VBSMs also can be used in lane change maneuvers. Such maneuvers can be dangerous if the vehicle changing lanes does not perform the necessary steps to check the safety of the maneuver, e.g., check back and side mirrors and the blind spot. new advanced driver assistance systems, such as blind spot warnings using onboard ultrasound sensors for instance, have been developed to help prevent vehicles from performing dangerous lane changes. However, these systems can have shortcomings when the sensors are dirty or have an obstructed field of view. And existing systems do not try to warn the endangered vehicle of another vehicle attempting a lane change. V2X communication helps solve this issue through applications such as BS/LCW using BSMs, however the vehicle attempting a lane change may be in unconnected vehicle and therefore not able to communicate its intent. VBSMs can help achieve that goal. Similar to the LTA use case, external sensors installed on the surrounding infrastructure can detect and track an unconnected vehicle attempting a lane change maneuver, collect basic information such as speed, acceleration, heading and past trajectory and transmit them to the RSE. The RSE will in turn build the predicted trajectory for the vehicle changing lanes using rule-based and machine learning algorithms, populate the required fields for the VBSM, and broadcast it on the behalf of the unconnected remote vehicle. The endangered vehicle's OBE will then receive the VBSM with information about a vehicle about to merge into the same lane, process it and determine whether the maneuver presents a potential danger and if it should display a lane change warning to the vehicle's driver. If the vehicle changing lanes is a connected vehicle, its OBE can similarly receive VBSMs from the RSE about a vehicle in its blind spot and determine whether the lane change maneuver presents a potential danger to surrounding traffic and if it should display a blind spot warning to the vehicle's driver. If both vehicles are connected, both vehicles will be able to broadcast BSMs to each other and enable BS/LCW applications. However, these applications will still benefit from applying the same rule-based or machine learning algorithms (or both) on the BSM data as mentioned above to predict, early on, the intent of a vehicle changing lanes with OBEs deciding whether to display a warning or not.

Autonomous Vehicles

The connectivity that is missing in non-connected road entities affects autonomous vehicles. Sensors on autonomous vehicles are either short range or have a narrow field of view. They are unable to detect a vehicle, for example, coming around a building on the corner of the street. They are also unable to detect a vehicle that may be hidden behind a delivery truck. These hidden vehicles, if they are non-connected entities, are invisible to the autonomous vehicle. These situations affect the ability of autonomous vehicle technology to achieve a level of safety required for mass adoption of the technology. A smart intersection can help to alleviate this gap and aid acceptance of autonomous vehicles by the public. An autonomous vehicle is only as good as the sensors it has. An intersection equipped with a smart RSE, can extend the reach of the onboard sensors around a blind corner or beyond a large truck. Such an extension will allow autonomous and other connected entities to co-exist with traditional non-connected vehicles. Such coexistence can accelerate the adoption of autonomous vehicles and the advantages that they bring.

The virtual connected ground transportation environment includes VBSM messages enabling the implementation of vehicle to vehicle (V2V), vehicle to pedestrian (V2P), and vehicle to devices (V2D) applications that would have been otherwise difficult to implement.

The system can use machine learning to quickly and accurately generate the fields of data required for the various safety messages, pack them into a VBSM message structure and send the message to ground transportation entities in the vicinity, using various media, such as, but not limited to, DSRC, WiFi, cellular, or traditional road signs.

Virtual Personal Safety Messages (VPMS)

The ground transportation environment can encompass not only non-connected vehicles but also non-connected people and other vulnerable road users.

In some regulatory regimes, connected vulnerable ground transportation entities would continuously send personal safety messages (PSMs). PSMs contain, among other information, the location, heading, speed, and future path of the vulnerable ground transportation entity. Connected vehicles and infrastructure can receive these messages and use them to create a map that includes the vulnerable entities and enhances the level of safety on the ground transportation network.

Therefore, the virtual connected ground transportation environment can bridge the gap between the future when most vulnerable ground transportation entities are expected to be connected and the current time when most vulnerable ground transportation entities have no connectivity. In the virtual connected ground transportation environment, smart traffic lights and other infrastructure installations can use sensors to track all vulnerable ground transportation entities (connected, non-connected) and generate VPSMs on their behalf.

A VPSM message can be considered a subset of a PSM. The VPSM need not contain all fields required to create a PSM but can contain data needed for safety assessment and prevention of dangerous situations and can include localization information including location, heading, speed, and trajectory. In some cases, nonstandard PSM fields may also be included in a VPSM, such as intent, posture, or direction of look of a driver.

The system can use machine learning to quickly and accurately generate these fields, pack them into a VPSM message structure, and send it to ground transportation entities in the vicinity using various media, such as, but not limited to, DSRC, WiFi, cellular, or traditional road signs.

VPSM messages enable the implementation of pedestrian to vehicle (P2V), pedestrian to infrastructure (P2I), pedestrian to devices (P2D), vehicle to pedestrian (V2P), infrastructure to pedestrians (I2P), and devices to pedestrians (D2P) applications that would have been otherwise difficult to implement.

Figure 16:
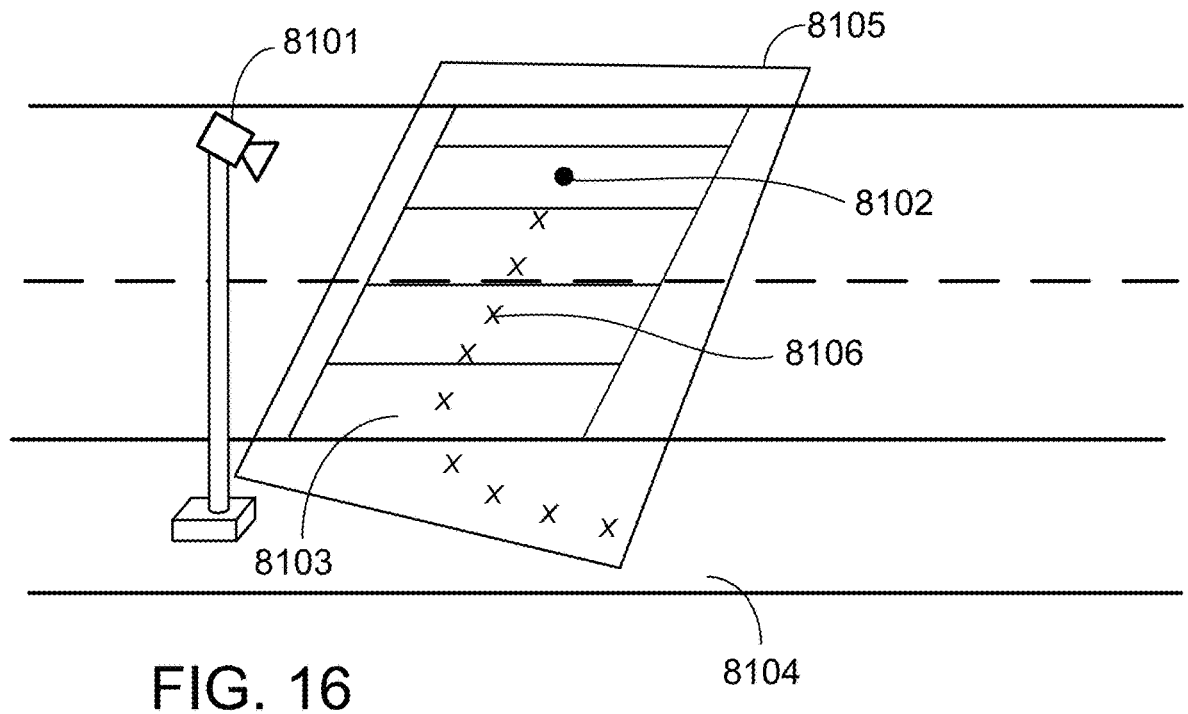

FIG. 16 depicts a pedestrian 8102 crossing a crosswalk 8103. The crosswalk 8103 can be at an intersection or a mid-block crosswalk across a stretch of road between intersections. A camera 8101 is used to monitor the sidewalk 8104. The global locations of the boundaries of the field of view 8105 of the camera 8101 can be determined at the time of installation. The field of view 8105 is covered by a predetermined number of pixels that is reflected by the specifications of camera 8101. A road entity 8102 can be detected within the field of view of the camera and its global location can be calculated. The speed and heading of the road entity 8102 can also be determined from its displacement at s times. The path of the road entity 8102 can be represented by breadcrumbs 8106 which is a train of locations that the entity 8102 has traversed. This data can be used to build a virtual PSM message. The PSM message can then be broadcast to all entities near the intersection.

Traffic Enforcement at Non-Signalized Intersections and Behavioral Enforcement

Another useful application of the system is traffic enforcement at non-signalized intersections (e.g. stop sign, yield sign) and enforcement of good driving behavior anywhere on the ground transportation network.

As a byproduct of generating VBSMs and VPSMs, the system can track and detect road users who do not abide by traffic laws and who are raising the probability of dangerous situations and collisions. The prediction of a dangerous situation can be extended to include enforcement. Dangerous situations need not end in collisions. Near misses are common and can raise the stress level of drivers leading to a subsequent accident. The frequency of near misses is positively correlated with the lack of enforcement.

Additionally, using VBSMs the system can detect improper driving behaviors such as abrupt lane changes and other forms of reckless driving. The data collected by the sensors can be used to train and enable machine learning models to flag ground transportation entities engaging in dangerous driving behaviors.

Enforcement authorities usually enforce the rules of the roads for ground transportation entities including vulnerable road users, but the authorities need to be present in the vicinity of the intersection to monitor, detect, and report violations. By tracking non-connected ground transport entities including vulnerable road users using VBSMs and VPSMs, smart RSEs could play the role of enforcement authorities and enforce the rules of the roads at intersections. For example, a non-connected vehicle tracked by a smart RSE could be detected to violate a stop or yield sign, could be identified, and could be reported to authorities. Similarly, a vulnerable road user near an intersection tracked by a smart RSE could be detected to unlawfully cross the intersection, could be identified, and could be reported to authorities.

For enforcement and other purposes, ground transportation entities may be identified using unique identification including but not limited to plate number recognition. Vulnerable road users may be identified using biometric recognition including but not limited to facial, retina, and voice wave identifications. In special cases that include civil or criminal investigations, social media networks (e.g., Facebook, Instagram, Twitter) may be also used to support the identification of a violating ground transportation entity or vulnerable road user. An example of leveraging social networks is to upload captured pictures of the violator on the social network and request users of the social network who recognize the violator to provide enforcement authorities with intelligence that will help identify the violator.

Enhanced SOBEs

Smart RSEs can use sensors and predictive models to predict dangerous situations and then send virtual safety messages (e.g., ICAs, VBSMs, VPSMs, VICAs, and VCSMs (Virtual Combined Safety Messages)) on behalf of non-connected road users including vulnerable ones. Smart OBEs can use incoming virtual or standard safety messages (e.g., BSMs, PSMs, VBSMs, VPSMs, VICAs, and VCSMs), vehicle sensors, and predictive models to predict dangerous situations and alert the driver of the host vehicle. Enhanced SOBEs can do all of that and send a (acting as a smart RSE) virtual BSMs, virtual PSMs, virtual ICAs, and VCSMs and standard messages wherever applicable on behalf of other road users even ones that are not connected, and especially vulnerable ones, b. advanced BSMs for its own ground transportation entity that include information based on intent prediction of its own behavior and c. messages such as GPS corrections, acting as an RSE).

In this document we have referred to BSMs, PSMs, ICAs, VBSMs, VPSMs, and VICAs. Other kinds of safety messages may exist or be developed, including cooperative perception messages (CPMs) under development as reported at https://www.sae.org/standards/content/j2945/8/. References to BSMs, PSMs, ICAs, VBSMs, VPSMs, and VICAs are intended to refer also to other safety messages, existing and future, including CPMs. As proposed, for example, CPMs can include data about (and in that sense be containers for) multiple objects such as VBSMs, VPSMs, and VICAs. We sometimes refer to messages that can be containers for VBSMs, VPSMs, VICAs, and other kinds of virtual safety messages such as VCSMs. An ESOBE can generate VCSMs based on its detection of ground transportation entities and other objects using sensors of its host vehicle. VCSMs can be broadcast periodically by the ESOBE to make other ground transportation entities aware of unconnected or occluded ground transportation entities or other objects.

Here we describe onboard equipment (OBEs) that in some respects can have enhanced and additional capabilities beyond the OBEs and SOBEs described earlier. In some implementations described here, such enhanced SOBEs (ESOBEs) have capabilities beyond serving, in effect, as smart RSE, for example, by leveraging sensors already present on a vehicle in which the ESOBE is present (the "host vehicle") along with the predictive models. In some cases, the ESOBEs can send, for example, to other vehicles or vulnerable road users: (1) virtual safety messages on behalf of one or more other vehicles and (2) enhanced standard safety messages for the host ground transport entity using intent prediction of its own behavior, along with (3) the virtual safety messages they send operating in their roles as onboard RSEs (e.g., GPS correction). We sometimes refer to the onboard RSEs as enhanced RSEs ("ERSEs").

Below, we describe scenarios and applications for enhanced SOBE ("ESOBE") technology including the following:

1. An ESOBE generates and broadcasts a virtual BSM, for example on behalf of another vehicle, which is skidding and is unconnected. Then a third connected vehicle from which the skidding vehicle cannot be seen because the view is obstructed, receives the virtual BSM and can use it to produce an early alert of the dangerous situation, for example, to the driver of the third vehicle.

2. An ESOBE generates and broadcasts a virtual PSM, for example on behalf of a pedestrian or other vulnerable road user crossing at a marked or designated crosswalk such as at an intersection. Then a third connected vehicle (including moving or stationary vehicles, such as public transportation vehicles) from which the crossing vulnerable road user cannot be seen because the view is obstructed, receives the virtual PSM and can use it to produce an early alert of the dangerous situation, for example, to the driver of the third vehicle.

3. An ESOBE generates and broadcasts a virtual PSM on behalf of a pedestrian or other vulnerable road user crossing at a midblock crossing, not at an intersection. Then a third connected vehicle from which the crossing vulnerable road user cannot be seen because the view is obstructed, receives the virtual PSM and can use it to produce an early alert of the dangerous situation, for example, to the driver of the third vehicle.

4. An ESOBE generates and broadcasts from its host vehicle a standard BSM that has been enhanced, for example, by including in the BSM a prediction of a forward collision determined based on information received by the ESOBE from the host vehicle's onboard cameras or sensors or both. A vehicle following the host vehicle can use the enhanced BSM to produce an early alert to the driver of the following vehicle that the host vehicle may brake hard within, for example, 1-2 seconds.

5. An ESOBE generates and broadcasts a GPS correction to other ground transportation entities. In this mode, the ESOBE acts essentially as an RSE, which helps extend the coverage of the RSE correction by leveraging the OBE's own GPS. The OBE also can save and retrieve the most recent GPS correction it received from the closest RSE it came near to.

In all of these scenarios as described above and below and in other scenarios, the messages broadcast by the ESOBE can include virtual messages bundled in VCSMs.

Figure 19:
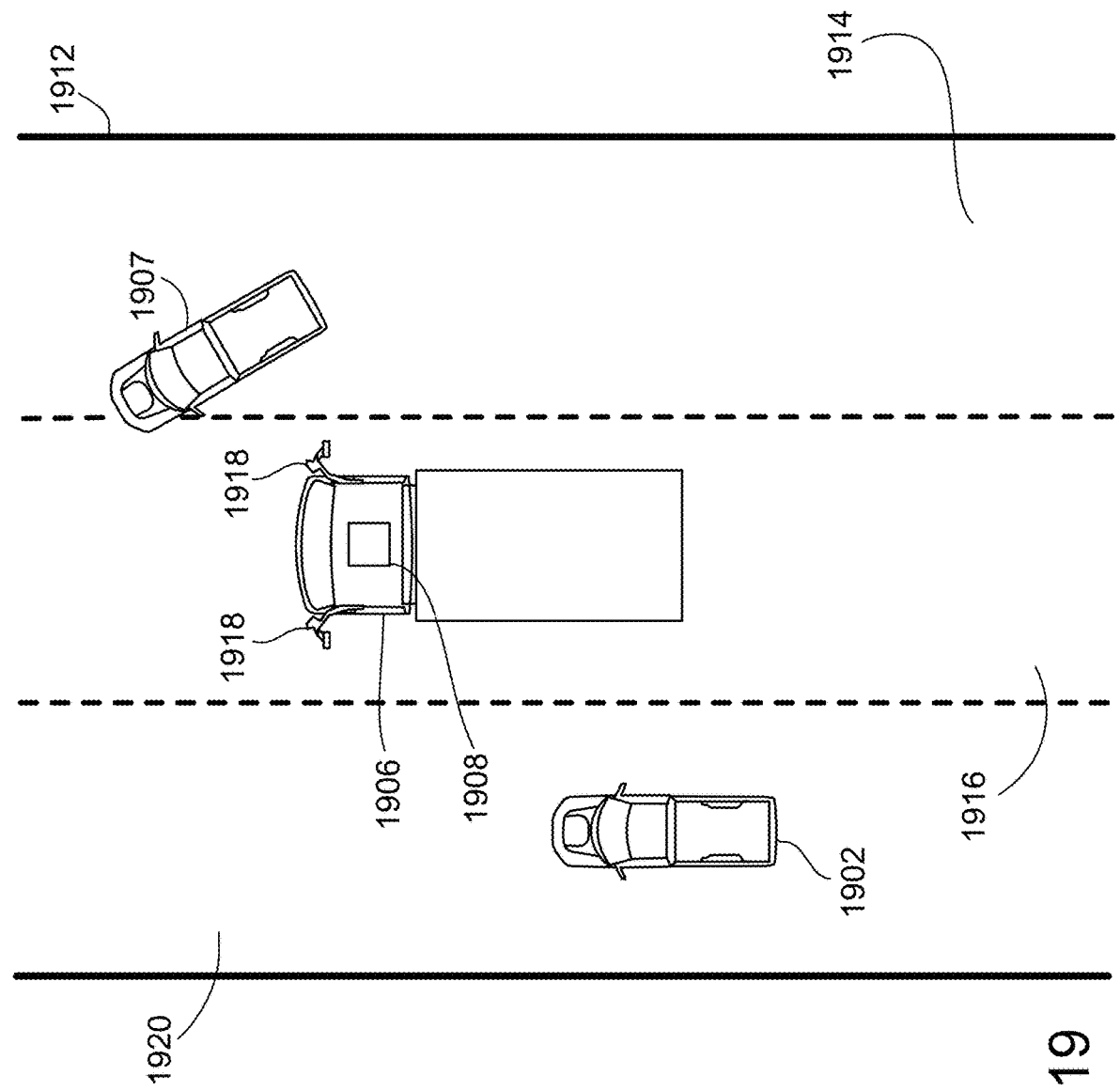

Occluded Skidding Vehicle and Angular Collision FIG. 19 depicts a vehicle or another ground transportation entity 1907 (unequipped with an OBE, for example, or otherwise unconnected) travelling in a lane 1914 and skidding across a multi-lane road 1912 into an adjacent lane 1916. The vehicle skidding can occur, for example, due to hard braking, a slippery road surface, or another cause. In this scenario, a vehicle 1906 is travelling in lane 1916 and is carrying an ESOBE 1908 and sensors 1918. The sensors 1918 can be, but are not limited to, cameras, radars, lidars, ultrasonic range sensors, and others, and combinations of them. The ESOBE 1908 processes data feeds from the sensors in real time and generates periodic basic safety messages (BSMs) for vehicle 1906.

A third vehicle 1902 is travelling in the lane 1920. The skidding vehicle 1907 or anything in front of or partially to the side of vehicle 1906 is occluded or partially occluded from being seen from vehicle 1902.

On detecting the skidding vehicle 1907 using sensors 1918 of the vehicle 1906, the ESOBE 1908 of the vehicle 1906 determines measured parameters of the vehicle 1907 (which in this scenario is assumed to be unequipped with an OBE). The measured parameters can include one or more of speed, heading, path history, path prediction, brake status, or others, or combinations of them. Based on these measured parameters, the ESOBE generates and broadcasts virtual BSMs on behalf of the unequipped vehicle 1907.

Based on the measured parameters determined by the ESOBE of the vehicle 1906 and the resulting virtual BSMs broadcast by the ESOBE of the vehicle 1906, vehicle 1902 has become aware of the skidding vehicle 1907 even though neither the driver of vehicle 1902 nor onboard sensors on vehicle 1902 can see vehicle 1907 because it is occluded by vehicle 106. With this information available to the SOBE of the vehicle 1902 along with its measured parameters of its own motion, including speed, heading, and others, the SOBE of the vehicle 1902 can predict a threat of possible collision with vehicle 1907 and alerts its driver accordingly.

In addition to making it easier for surrounding vehicles (in this scenario, vehicle 1902, for example) to become aware of unseen unconnected vehicles, if the ESOBE of vehicle 1906 detects the possibility of angular collision between vehicle 1907 and 1902 in lane 1920 by predicting the skidding path for vehicle 1907, the ESOBE of vehicle 1906 can generate and send intersection collision avoidance messages (ICAs). If vehicle 1902 is capable of receiving and handling ICA messages it can receive them, process them, and alert its driver of a possible angular (intersection) collision.

In typical DSRCs (dedicated short range communication), by contrast, ICAs are generated and sent only at road intersections to alert drivers about angular collisions (e.g., where one vehicle is predicted to cross the path of another vehicle). In the technology that we describe here, because the ESOBE is equipped with prediction algorithms, ICAs can be triggered, generated, and sent from the ESOBE of a moving vehicle even at locations other than road intersections. Such ICAs can be used to alert drivers and enable them to avoid even an angular collision that might occur on a straight road segment as described above.

Occluded Pedestrian: Crosswalk Crossing

In implementations according to this scenario, an ESOBE can act as a broadcaster of virtual PSMs on behalf of pedestrians or other vulnerable road users, for example.

Figure 20:
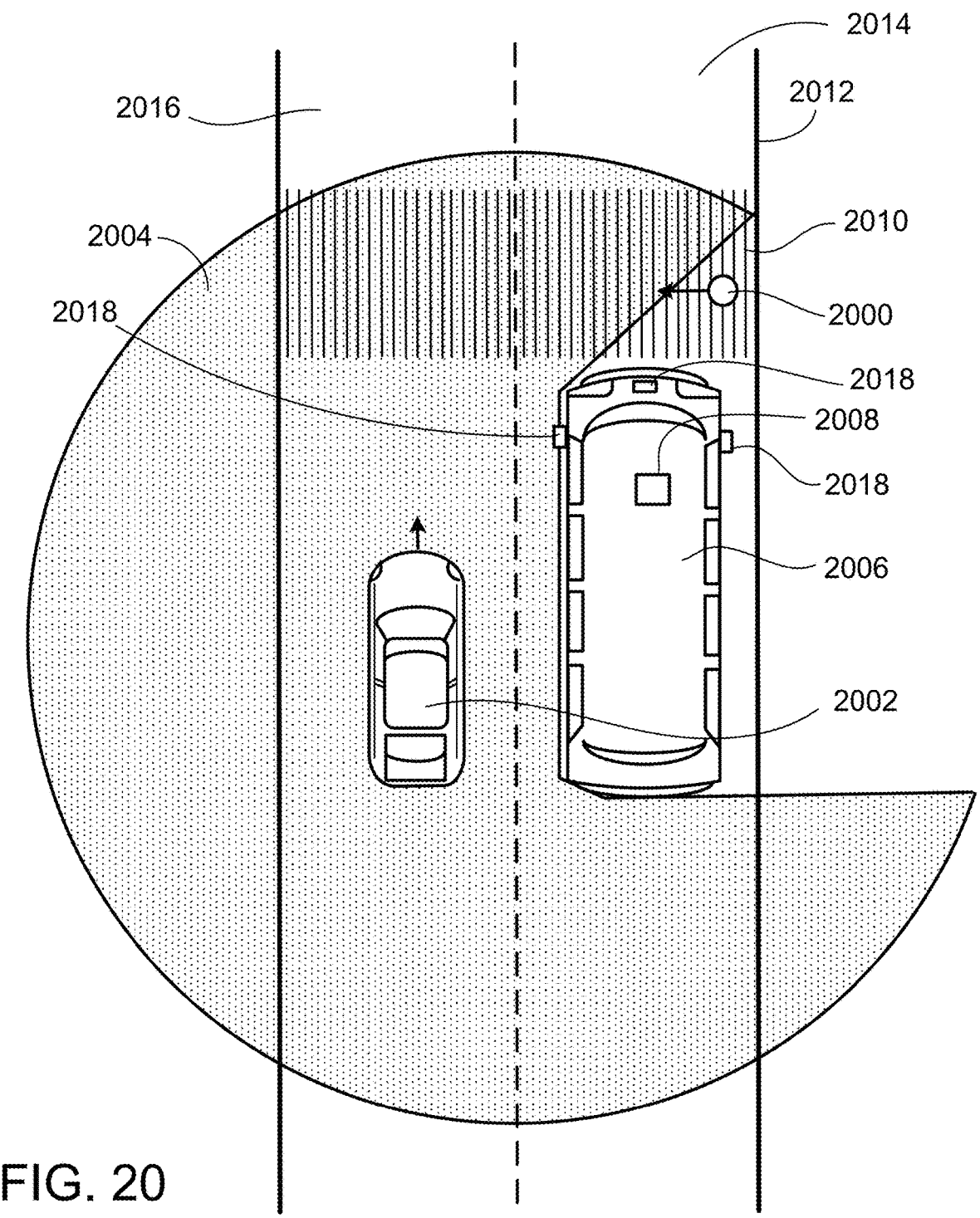

As shown in FIG. 20, in this scenario, a pedestrian 2000 is crossing a two-lane road 2012 at a crosswalk 2010. A vehicle 2006 travelling in lane 2014 occludes (obstructs the view of) the pedestrian 2000 from a vehicle 2002 travelling in lane 2016. Zone 2004 depicts the range of awareness (ability to see) of the driver and sensors of vehicle 2002. Vehicle 2006 limits zone 2004, and anything behind vehicle 2006 (relative to vehicle 2002) is occluded from being viewed from vehicle 2002. If vehicle 2002 keeps moving unaware of the location, speed, and heading of the pedestrian 2000, a serious accident may occur.

A bus 2006 is equipped with an ESOBE 2008 and sensors 2018. The sensors 2018 can be, but are not limited to, cameras, radars, lidars, ultrasonic range sensors, and others, and combinations of them. The ESOBE 2008 processes the simultaneous data feeds of sensors 2018 in real time. When the ESOBE 2008 detects the pedestrian 2000 using the sensor data, the ESOBE 2008 automatically begins broadcasting virtual PSM messages on behalf of the pedestrian 2000 that can be received by the vehicle 2002. As a result, the vehicle 2002 becomes aware of pedestrian 2000 crossing lane 2014 even though neither the driver nor onboard sensors of vehicle 2002 are able to see the pedestrian 2000 on the other side of the vehicle 2006.

Occluded Pedestrian: Midblock Crossing

This scenario is similar to the previous scenario except that here the pedestrian is crossing the road midblock, away from a crosswalk or other formal road intersection.

Figure 21:
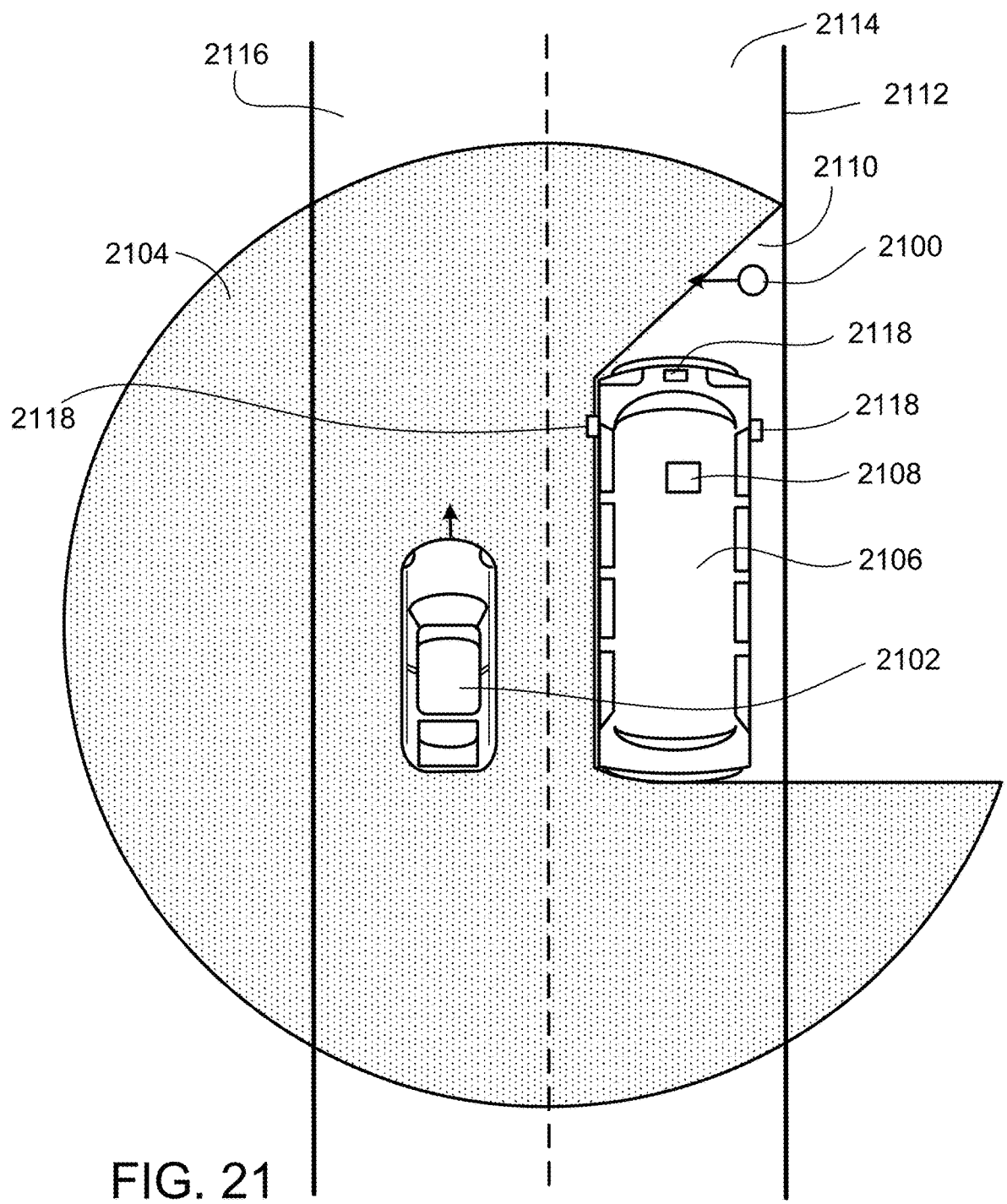

As shown in FIG. 21, the pedestrian 2100 is crossing road 2112 in front of vehicle 2106. Pedestrian 2100 is occluded from view of the driver and sensors of vehicle 2102. The awareness zone of vehicle 2102 is depicted by the dotted region 2104.

A vehicle 2106 is equipped with ESOBE 2108 able to transmit and receive V2X messages such as PSMs and BSMs. The ESOBE 2108 is also capable of processing simultaneous data feeds from sensors 2118.

Once detected by the ESOBE 2108, information that includes, but is not limited to, the global location, speed, and heading of pedestrian 2100 is encoded into a virtual PSM message, which is broadcast. Vehicle 2102 receives the virtual PSM message and is then aware of pedestrian 2100. Algorithms on board vehicle 2102 are able to predict if there is an impending dangerous situation and take appropriate action that includes, but is not limited to, alerting the driver or slowing down or stopping the vehicle automatically.

Occluded Pedestrian: Forward Collision

Figure 22:
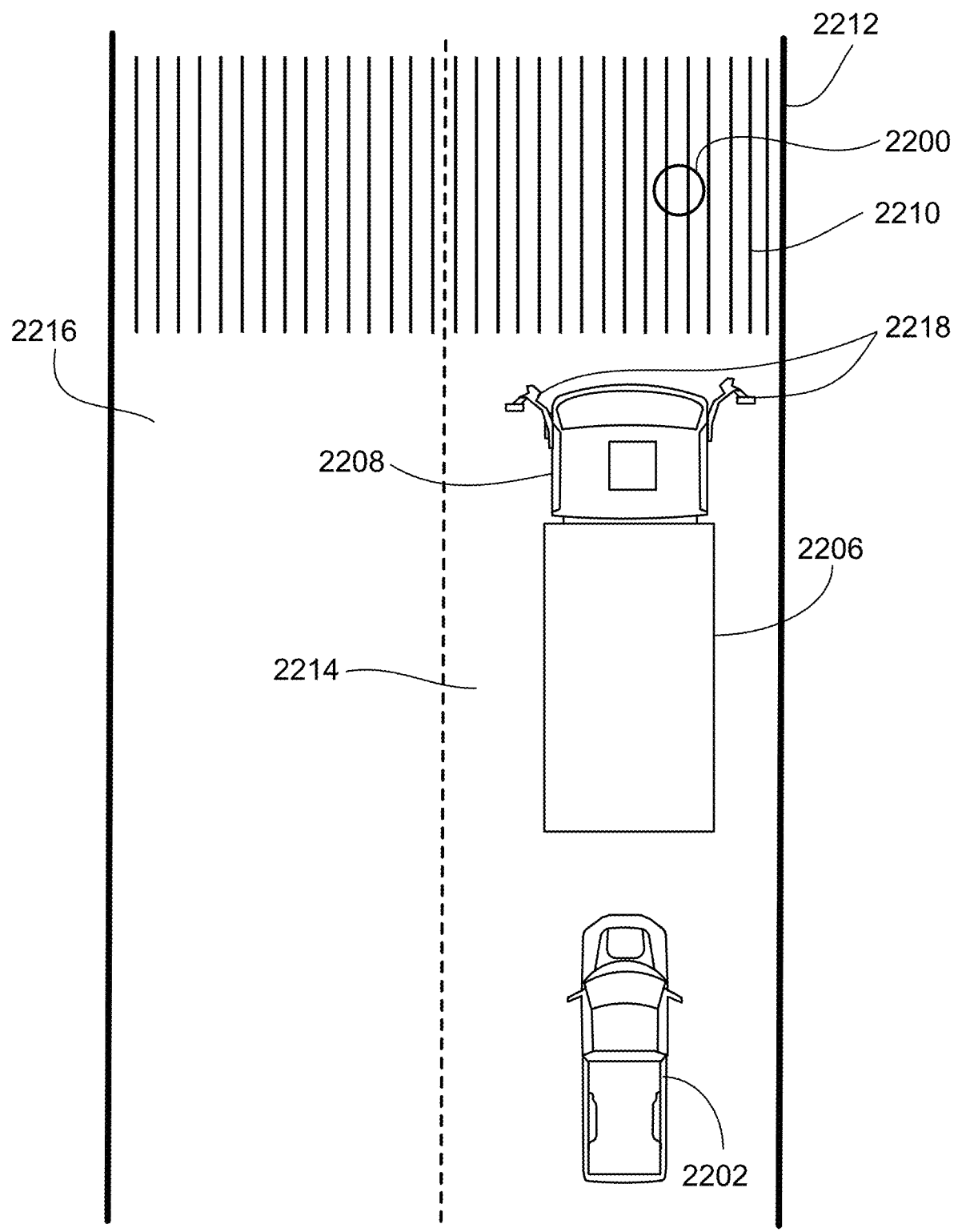

FIG. 22 depicts a pedestrian 2200 crossing a two-lane road 2212 at a crosswalk 2210. A bigger vehicle (for example, a truck) 2206 is travelling in lane 2214 and carries an ESOBE 2208 and sensors 2218. The sensors 2218 can be, but are not limited to, cameras, radars, lidars, ultrasonic range sensors, and others, and combinations of them. The ESOBE 2208 processes the data feeds from the sensors in real time.

Another vehicle 2202 is travelling behind the bigger vehicle 2206 in the same lane 2214. The pedestrian 2200 or anything else in front of vehicle 2206 is occluded from the view from the vehicle 2202.

If the vehicle 2206 must brake suddenly because of the presence of pedestrian 2200 (whom the vehicle 2202 is unaware of), the vehicle 2202 may collide with the rear end of vehicle 2406.

On detecting the pedestrian 2200 using the sensors 2218, the ESOBE 2208 of vehicle 2206 immediately starts broadcasting virtual PSMs on behalf of the pedestrian 2200 in addition to the regular basic safety messages (BSMs) that it transmits on its own behalf. As a result, along with knowledge of presence of the vehicle 2206 (from the BSMs), the vehicle 2202 is also aware of the pedestrian 2200 crossing the lane 2214 (from the virtual PSMs) even though neither the driver nor onboard sensors of the vehicle 2202 can see or sense beyond vehicle 2206.

The ESOBE in the vehicle 2206 executes artificial intelligence processes that learn from its driver's behavior in various situations. For example, on detecting a pedestrian 2200, the ESOBE 2208 applies an AI algorithm to predict whether the driver of the vehicle 2206 is going to apply brakes and to predict a future time when that might happen. Based on these predictions, the ESOBE may decide to add the braking information in the BSM messages that it broadcasts to other vehicles sooner than would otherwise occur in a typical system. This earlier delivery of a braking message, for example, can give other vehicles such as the vehicle 2202 more time for predicting a collision ahead. In other words, other vehicles can benefit from the AI capabilities in the ESOBE of the first vehicle.

ESOBE—Position Correction Service

Figure 23:
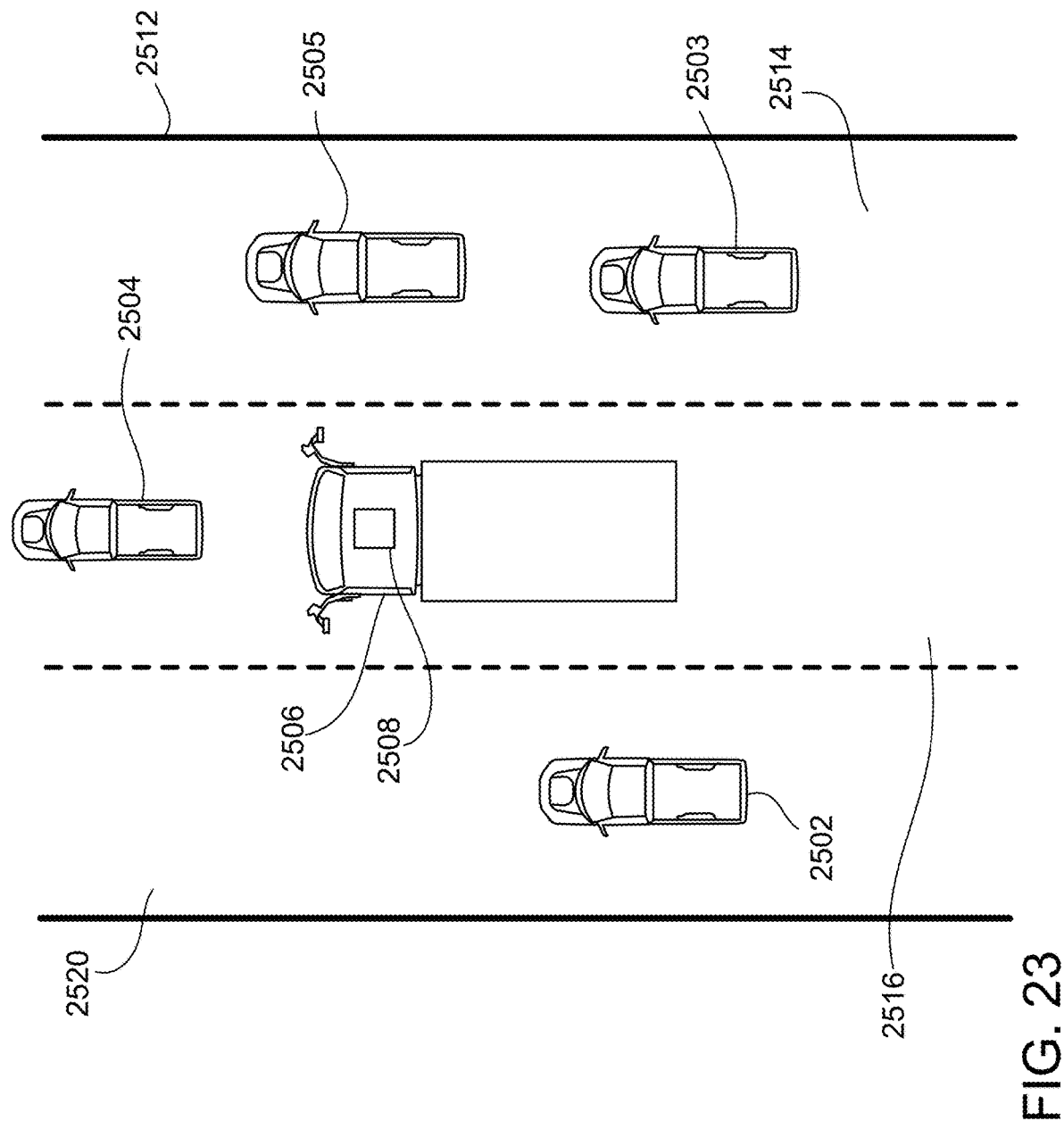

Availability of high accuracy GPS location data is important for DSRC based V2X safety applications or for other applications that expect or require higher than typical GPS accuracy. ESOBEs can provide GPS correction information to enhance the accuracy of GPS location data for nearby ground transportation entities. As shown in FIG. 23 four vehicles (2502, 2503, 2504, and 2505) travelling in a given direction in different lanes of a road may be able to use GPS correction data, for example, in the scenario described below, and others.

In this scenario, a vehicle (such as a truck or bus) 2506 is travelling in one lane 2516 and carries an ESOBE 2508 capable of transmitting and receiving V2X messages. Although vehicle 2506 is depicted as a large vehicle, it could be any ground transportation entity of any size.

Assume (a) there is no RSE present in the vicinity of this area, (b) the vehicle 2506 (including its ESOBE) has recently passed through an area where an RSE having differential GNSS (global navigation satellite system) broadcast capabilities (using techniques like RTK, DGPS or Wide Area RTK) over DSRC was present, (c) the vehicle 2506 is no longer in the vicinity of that RSE, and (d) the vehicle 2506 (and its ESOBE) has passed through an area where a particular RSE was present and the particular RSE was transmitting periodic RTCM (radio technical commission for Maritime) correction messages.

On receiving these RTCM correction messages, the ESOBE 2508 on vehicle 2506 corrected its own position and also stored the RTCM correction data for later usage. While the particular RSE was in range, the ESOBE continued to correct its position using received correction messages and to update these messages for later usage.

Once the ESOBE is out of the particular RSE's coverage area, the ESOBE uses the stored correction data to build newer correction messages based on its current position and to provide correction services (based on the newer correction messages) to other vehicles (2502, 2503, 2504, 2505 in FIG. 23) similar to the correction services that would be provided by an RSE if one were in range. The distance of the ESOBE from the particular RSE from which the correction data had been collected and the ESOBE's current positional information can be used for updating the correction messages (e.g., creating newer correction messages) before re-broadcasting them as part of the correction services. In this way, the ESOBE effectively operates as a base station providing accurate RTCM correction data for other road users in an area where no RSE is within range. Thus, the ESOBE not only forwards the correction data from the RSE or other external sources, but also updates the correction data based on the current location of the host vehicle and other factors mentioned here.

In addition, the ESOBE runs algorithms to ascertain correctness of the rebuilt correction data before broadcasting it. The correction data is broadcast only if the algorithm confirms a very high confidence level in regenerated correction data.

In some implementations, the algorithm for retransmission of the correction data takes into account the following information, among others:

time passed since the ESOBE received the correction data from the RSE, distance travelled from the RSE, direction of travel (heading) to determine if the correction still applies at the current vehicle location, and confidence level of the original correction data received from RSE, and combinations of them.

In some examples, another feature of the ESOBE is that if it has a direct access to an external service transmitting RTCM correction feed over the Internet, it can generate DSRC RTCM correction messages by itself using this feed. The ESOBE can decide to switch to this mode in the scenario where an RSE is not present or if the confidence level of the data received from the RSE is not adequate. Here the ESOBE has an intelligence to choose the better source of correction information.

Among the benefits of an ESOBE being able to build on its own or rebuild the ones received from RSE and send correction messages are assisting ground transportation entities having low end, inexpensive GPS devices to correct their positions; helping ground transportation entities to execute safety algorithms more reliably; extending the effective coverage areas of RSEs; and broadcasting RTCM corrections over the DSRC network or other short range vehicular network using V2X standard correction messages.

Other implementations are also within the scope of the following claims.

The invention claimed is:

1. An apparatus comprising:
an equipment on board a first ground transportation entity, the equipment having
(a) a receiver for information generated by a sensor of an environment of the first ground transportation entity;
(b) at least one processor; and
(c) a memory storing instructions executable by the at least one processor to perform operations comprising:
based at least on the information generated by the sensor, generating a first safety message on behalf of a second unconnected ground transportation entity that is incapable of generating or sending safety messages, the first safety message comprising kinematic information of the second unconnected ground transportation entity;
sending the first safety message to a third ground transportation entity on behalf of the second unconnected ground transportation entity;
based at least on the information generated by the sensor, detecting a fourth ground transportation entity in a vicinity of the first ground transportation entity;
based on detecting the fourth ground transportation entity, generating (i) a prediction of a future change in motion of the first ground transportation entity, and (ii) a prediction of a future time at which the predicted future change in motion will occur;

generating a second safety message, the second safety message comprising the prediction of the future change in motion and the prediction of the future time; and sending the second safety message to the third ground transportation entity or to a fifth ground transportation entity.

2. The apparatus of claim 1 in which the operations comprise generating a prediction for use in generating the first safety message.

3. The apparatus of claim 2 in which the prediction is generated by a predictive model.

4. The apparatus of claim 3 in which the predictive model is configured to predict a dangerous situation involving at least one of the first ground transportation entity, the second unconnected ground transportation entity, the third ground transportation entity, or the fourth ground transportation entity.

5. The apparatus of claim 4 in which the dangerous situation involves a crossing of a lane of a road by the second unconnected ground transportation entity or the third ground transportation entity.

6. The apparatus of claim 5 in which the second unconnected ground transportation entity comprises a vehicle, and in which the dangerous situation comprises skidding across the lane by the vehicle.

7. The apparatus of claim 5 in which the second unconnected ground transportation entity comprises a pedestrian or another road user crossing the road.

8. The apparatus of claim 7 in which the pedestrian or the other road user is crossing the road at an intersection.

9. The apparatus of claim 7 in which the pedestrian or the other road user is crossing the road other than at an intersection.

10. The apparatus of claim 4 in which the dangerous situation comprises a predicted collision between the third ground transportation entity and the second unconnected ground transportation entity.

11. The apparatus of claim 1 in which the first ground transportation entity comprises a vehicle and the second unconnected ground transportation entity comprises a pedestrian or another road user.

12. The apparatus of claim 1 in which the third ground transportation entity is following the second unconnected ground transportation entity and a view of the second unconnected ground transportation entity from the third ground transportation entity is occluded.

13. The apparatus of claim 1 in which the third ground transportation entity is in a lane adjacent a lane in which the second unconnected ground transportation entity is traveling.

14. The apparatus of claim 1 in which the operations comprise determining motion parameters of the second unconnected ground transportation entity.

15. The apparatus of claim 1 in which the third ground transportation entity has only an obstructed view of the second unconnected ground transportation entity.

16. The apparatus of claim 1 in which the first safety message comprises a virtual basic safety message and in which the second unconnected ground transportation entity comprises an unconnected vehicle.

17. The apparatus of claim 1 in which the first safety message comprises a virtual personal safety message.

18. The apparatus of claim 1 in which the equipment comprises a second receiver for information sent wirelessly from a source external to the first ground transportation entity.

19. The apparatus of claim 1 including the first ground transportation entity.

20. The apparatus of claim 1 in which the first safety message comprises a virtual intersection collision avoidance message (VICA).

21. The apparatus of claim 1 in which the first safety message comprises an intersection collision avoidance message (ICA).

22. The apparatus of claim 1 in which the first safety message comprises a virtual combined safety message (VCSM).

23. An apparatus comprising:
an equipment on board a first ground transportation entity, the equipment having
(a) a receiver for position correction information sent from a source external to the first ground transportation entity, the position correction information representing a correction to a position of the first ground transportation entity, wherein the position correction information comprises at least one of a Radio Technical Commission for Maritime (RTCM) correction message or global navigation satellite system (GNSS) position correction information,
(b) at least one processor, and
(c) a memory storing instructions executable by the at least one processor to perform operations comprising:
generating a position correction message based at least on the position correction information, the position correction message being configured to be used by a second ground transportation entity to correct a position of the second ground transportation entity; and
transmitting the position correction message to the second ground transportation entity.

24. The apparatus of claim 23 in which the operations comprise generating the position correction message based on information representing a parameter of position or motion of the first ground transportation entity.

25. The apparatus of claim 24 in which the parameter of position or motion comprises a current position of the first ground transportation entity.

26. The apparatus of claim 23 in which the source external to the first ground transportation entity comprises a roadside equipment or an external service configured to transmit the position correction information over the Internet.

27. The apparatus of claim 24 in which the operations comprise determining a level of confidence in the position correction message.

28. A method comprising
receiving, by equipment on board a first ground transportation entity, information generated by a sensor, mounted on the first ground transportation entity, of an environment of the first ground transportation entity;
based at least on the information generated by the sensor, generating, by the equipment, a first safety message on behalf of a second unconnected ground transportation entity that is incapable of generating or sending safety messages, the first safety message comprising kinematic information of the second unconnected ground transportation entity;
sending, by the equipment, the first safety message to a third ground transportation entity on behalf of the second unconnected ground transportation entity;

based at least on the information generated by the sensor, detecting a fourth ground transportation entity in a vicinity of the first ground transportation entity;

based on detecting the fourth ground transportation entity, generating (i) a prediction of a future change in motion of the first ground transportation entity, and (ii) a prediction of a future time at which the predicted future change in motion will occur;

generating a second safety message, the second safety message comprising the prediction of the future change in motion and the prediction of the future time; and sending the second safety message to the third ground transportation entity or to a fifth ground transportation entity.

29. The method of claim 28 comprising generating a prediction for use in generating the first safety message.

30. The method of claim 29 in which the prediction is generated by a predictive model.

31. The method of claim 30 in which the predictive model is configured to predict a dangerous situation involving at least one of the first ground transportation entity, the second unconnected ground transportation entity, the third ground transportation entity, or the fourth ground transportation entity.

32. The method of claim 31 in which the dangerous situation involves a crossing of a lane of a road by the second unconnected ground transportation entity or the third ground transportation entity.

33. The method of claim 32 in which the second unconnected ground transportation entity comprises a vehicle and the dangerous situation comprises skidding across the lane by the vehicle.

34. The method of claim 32 in which the second unconnected ground transportation entity comprises a pedestrian or another road user crossing the road.

35. The method of claim 34 in which the pedestrian or the other road user is crossing the road at an intersection.

36. The method of claim 34 in which the pedestrian or the other road user is crossing the road other than at an intersection.

37. The method of claim 31 in which the dangerous situation comprises a predicted collision between the third ground transportation entity and the second unconnected ground transportation entity.

38. The method of claim 31 in which the first ground transportation entity comprises a vehicle and the second unconnected ground transportation entity comprises a pedestrian or another road user.

39. The method of claim 28 in which the third ground transportation entity is following the second unconnected ground transportation entity and a view of the second unconnected ground transportation entity from the third ground transportation entity is occluded.

40. The method of claim 28 in which the third ground transportation entity is in a lane adjacent a lane in which the second unconnected ground transportation entity is traveling.

41. The method of claim 28 comprising determining motion parameters of the second unconnected ground transportation entity.

42. The method of claim 28 in which the third ground transportation entity has only an obstructed view of the second unconnected ground transportation entity.

43. The method of claim 28 in which the first safety message comprises a virtual basic safety message.

44. The method of claim 28 in which the first safety message comprises a virtual personal safety message.

45. The method of claim 28 comprising receiving information sent wirelessly from a source external to the first ground transportation entity.

46. The method of claim 28 in which the first safety message comprises a virtual intersection collision avoidance message (VICA).

47. The method of claim 28 in which the first safety message comprises an intersection collision avoidance message (ICA).

48. The method of claim 28 in which the first safety message comprises a virtual combined safety message (VCSM).

49. A method comprising receiving, by equipment on board a first ground transportation entity, position correction information sent from a source external to the first ground transportation entity, the position correction information representing a correction to a position of the first ground transportation entity, wherein the position correction information comprises at least one of a Radio Technical Commission for Maritime (RTCM) correction message or global navigation satellite system (GNSS) position correction information;

generating, by the equipment, a position correction message based at least on the position correction information, the position correction message being configured to be used by a second ground transportation entity to correct a position of the second ground transportation entity; and transmitting, by the equipment, the position correction message to the second ground transportation entity.

50. The method of claim 49, comprising:

generating the position correction message based on information representing a parameter of position or motion of the first ground transportation entity.

51. The method of claim 50 in which the parameter of position or motion comprises a current position of the first ground transportation entity.

52. The method of claim 49 in which the source external to the first ground transportation entity comprises a roadside equipment or an external service configured to transmit the position correction information over the Internet.

53. The method of claim 50 comprising determining a level of confidence in the position correction message.

54. The apparatus of claim 1 in which the first safety message comprises a combined safety message (CSM).

55. The method of claim 28 in which the first safety message comprises a combined safety message (CSM).

56. The apparatus of claim 1, in which the operations comprise generating a prediction of a dangerous situation involving the fourth ground transportation entity, and wherein the second safety message comprises the prediction of the dangerous situation.

57. The apparatus of claim 1, in which the prediction of the future change in motion and the prediction of the future time are based on an artificial intelligence model trained to predict operator behavior.

58. The apparatus of claim 57 in which the artificial intelligence model is trained based on behavior of an operator of the first ground transportation entity.

59. The apparatus of claim 1 in which the future change in motion comprises braking.

60. The apparatus of claim 1 in which the prediction of the future change in motion comprises that the future change in motion will be initiated by an operator of the first ground transportation entity.

61. The apparatus of claim 23 in which the second ground transportation entity is an unconnected ground transportation entity.

* * * * *